(12) United States Patent
Fukushima et al.

(10) Patent No.: US 7,395,431 B2
(45) Date of Patent: Jul. 1, 2008

(54) DATA ENCRYPTION METHOD, RECORDING MEDIUM, DATA TRANSFER APPARATUS, AND ENCRYPTED DATA DECRYPTION METHOD

(75) Inventors: Akio Fukushima, Yokohama (JP); Hiroyuki Kimura, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 763 days.

(21) Appl. No.: 10/106,593

(22) Filed: Mar. 25, 2002

(65) Prior Publication Data
US 2003/0120926 A1    Jun. 26, 2003

(30) Foreign Application Priority Data
Dec. 25, 2001    (JP)    ............................. 2001-390823

(51) Int. Cl.
H04L 9/00    (2006.01)
H04L 9/30    (2006.01)
H04K 1/00    (2006.01)
H04N 7/167    (2006.01)
G06K 15/00    (2006.01)

(52) U.S. Cl. ........................... 713/176; 380/45; 380/28; 380/201; 358/3.28; 705/51; 705/57

(58) Field of Classification Search ................. 713/176; 380/201, 45, 28–30; 705/50–51, 57; 358/3.28
See application file for complete search history.

(56) References Cited

U.S. PATENT DOCUMENTS

| 6,182,218 | B1 * | 1/2001 | Saito ........................... 713/176 |
| 6,209,097 | B1 * | 3/2001 | Nakayama et al. .......... 713/193 |
| 6,684,199 | B1 * | 1/2004 | Stebbings .................... 705/57 |
| 6,865,550 | B1 * | 3/2005 | Cok ............................. 705/51 |
| 7,039,189 | B1 | 5/2006 | Kienzle et al. |
| 7,114,073 | B2 * | 9/2006 | Watanabe .................... 713/176 |
| 2002/0106192 | A1 * | 8/2002 | Sako ............................ 386/94 |
| 2003/0177093 | A1 | 9/2003 | Hirano et al. |

FOREIGN PATENT DOCUMENTS

| JP | 2000-339227 | 12/2000 |
| JP | 2001-177816 | 6/2001 |

OTHER PUBLICATIONS

Bruce Schneier, Applied Cryptography, 1996, John Wiley and Sons, Second edition, pp. 357-358.*

* cited by examiner

Primary Examiner—L. L. Moise
Assistant Examiner—Minh Dieu Nguyen
(74) Attorney, Agent, or Firm—Townsend and Townsend and Crew LLP

(57) ABSTRACT

It is an object of the present invention to more strongly protect data to be distributed from being illegally plagiarized, and further, to add an electronic watermark function necessary to protect the copyright to all reproduction means apparatuses. In order to achieve the above-described objects, according to the present invention, data targeted for protection is encrypted, and an encryption key required for decrypting this encrypted data and reproduction control data for protecting the copyright are embedded in encrypted data through the use of the electronic watermark. Thus, when reproducing the data, the electronic watermark is detected, and the encryption key required for decrypting the cryptogram and the reproduction control data for protecting the copyright are restored. Through the use of the restored encryption key, the cryptogram is decrypted. Thus, through the use of the reproduction control data restored, the reproduction of the data targeted for protection is controlled.

16 Claims, 18 Drawing Sheets

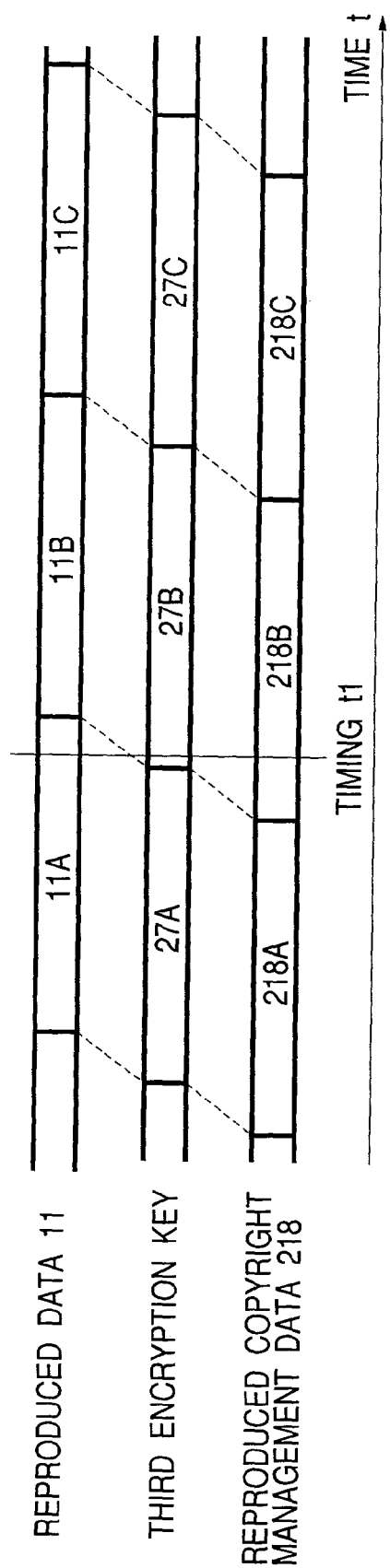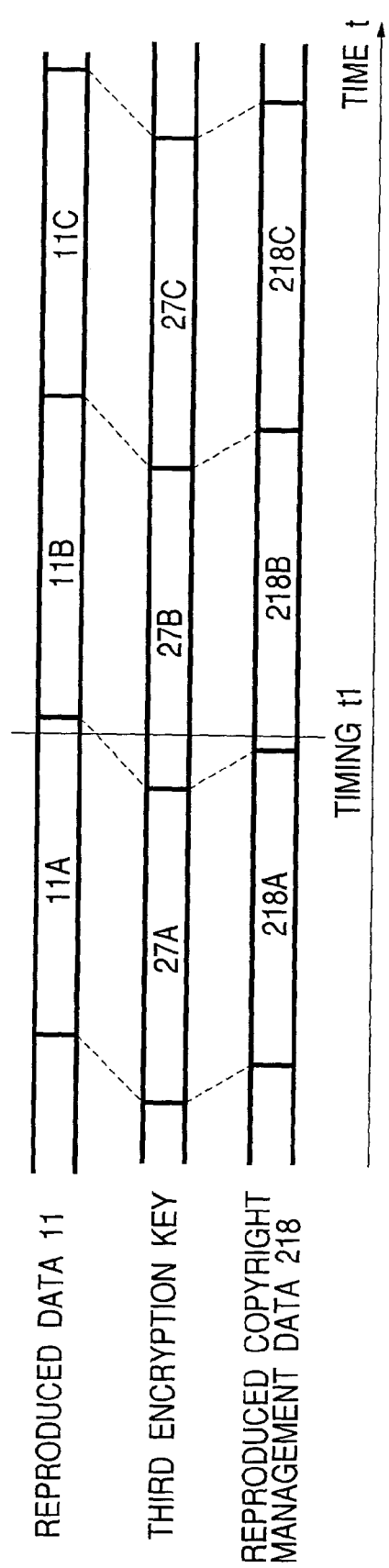

DATA ENCRYPTION METHOD, RECORDING MEDIUM, DATA TRANSFER APPARATUS, AND ENCRYPTED DATA DECRYPTION METHOD

BACKGROUND OF THE INVENTION

1. Field of the Invention

The present invention relates to accumulation technique for encrypted data obtained by encrypting image data, sound data and the like, and communication, transmission and broadcasting technique for encrypted data obtained by encrypting image data, sound data and the like, and to technique for reproducing encrypted data obtained by encrypting image data, sound data and the like.

2. Description of the Related Art

When image data, sound data and data to be used for a computer and the like are transmitted/broadcast/accumulated to move/reproduce the data, in order to prevent contents of these data from being illegally plagiarized or copyright and the like from being infringed on by a third person, the data is encrypted with the aim of concealing the data (specifically, CPRM (Content Protection for Recordable Media), CPPM (Content Protection for Prerecorded Media) and the like)). In such an encryption process, the original data is encrypted through the use of encryption key data, and in a decryption process, the encrypted data can be restored to its original state through the use of decryption key data to obtain the original data. In the prior art, the encrypted data and the decryption key data have only been arranged in a predetermined data area, and information itself concerning these arrangements has hardly been concealed.

Here, the description will be made on the assumption that encrypted data is decrypted without the aid of the decryption key data. In a general encryption method, information concerning bit length of encryption key/decryption key and the encryption algorithm has been stipulated by a standard or the like and has frequently been opened to the public. Also, the strength (difficulty in being decrypted) of the cryptogram is correlated with size of an amount of calculation required for decryption that is substantially determined by complicatedness of the cryptogram algorithm and bit length of the decryption key. Therefore, if time required for the decryption is ignored, the decryption is possible, and for that reason, when the calculating capability usable at the point of time is used, it is judged whether or not the cryptogram can withstand the use by whether or not the decryption can be performed within practical time. Accordingly, since the amount of calculation required for the decryption is large at a certain point of time so that the decryption can not be performed within practical processing time, a cryptograph evaluated to have sufficient strength may be re-evaluated to have insufficient strength of cryptograph because of shortened decryption time associated with speedup of the computer.

Also, there has been studied a form in which copyright management information is embedded in data targeted for protection as an electronic watermark, and reproducing is restrained in accordance with copyright management information obtained by detecting the electronic watermark to protect the copyright. Also, it has been studied to make it obligatory to mount an electronic watermark detection function onto the reproducing means apparatus. Since when an electronic watermark algorithm is opened to the public, there is a possibility that it may be illegally read or rewritten by a third person, the copyright management information is strictly concealed. Also, as regards the electronic watermark technique, even when the algorithm has become well-known, the embedded data cannot be illegally read and rewritten so long as you do not know a method to change the original data, or specific information (referred to as "mask data" herein) stipulating the contents and the like, and therefore, this mask data is also strictly concealed. As described above, the electronic watermark prevents any illegal conduct by concealing both the algorithm and the mask data.

As a method for improving the problem that the cryptograph strength is re-evaluated to be insufficient because of shortened decryption time associated with speedup of the computer by combining the data encryption with the electronic watermark technique, those specified in U.S. Patent Application Publication No. US 2001/0004736A1.

SUMMARY OF THE INVENTION

It is an object of the present invention to improve any of the following problems.

(1) There will be proposed such a data encryption method that the encrypted data cannot be reproduced only by illegally acquiring an encryption key embedded as an electronic watermark.

(2) There will be proposed such a data encryption method that all encryption keys cannot be detected only by illegally acquiring one kind of electronic watermark algorithm or mask data.

(3) In addition to concealment of data due to encryption or the electronic watermark, the data will also be concealed by a third method and a further strong data encryption method will be proposed.

In order to improve any of them, the present invention will adopt the following:

(1) A data encryption method including: an encrypted data generating step for encrypting data through the use of an encryption key to generate first encrypted data; a decryption key generating step for generating a decryption key corresponding to the above-described encryption key; and an electronic watermark embedding step for embedding the decryption key in the first encrypted data as an electronic watermark of the first form to generate second encrypted data.

(2) A data encryption method including: a first encrypted data generating step for encrypting data through the use of a first encryption key to generate the first encrypted data; a second encrypted data generating step for encrypting the first encrypted data through the use of a second encryption key to generate the second encrypted data; a decryption key generating step for generating a first decryption key corresponding to the first encryption key and a second decryption key corresponding to the second encryption key; and a first electronic watermark embedding step for embedding either the first decryption key or the second decryption key in the second encrypted data as the electronic watermark of the first form to generate third encrypted data.

(3) A data encryption method including: an encrypted data generating step for encrypting data through the use of an encryption key to generate first encrypted data; a decryption key generating step for generating a decryption key corresponding to the above-described encryption key; a first electronic watermark embedding step for embedding the decryption key in the first encrypted data as an electronic watermark to generate second encrypted data; and a step for adding restrictions on decryption based on pass word on the second encrypted data.

By adopting such a method, it is possible to perform strong data protection as compared with the conventional data protection method.

BRIEF DESCRIPTION OF THE DRAWINGS

FIG. 10 is a view showing an example of time relationship between reproduced data 11, the third encryption key 27 and decrypted copyright data 218 according to a fourth embodiment;
FIG. 11 is a view showing another example of time relationship between reproduced data 11, the third encryption key 27 and decrypted copyright data 218 according to the fourth embodiment.

DETAILED DESCRIPTION OF THE PREFERRED EMBODIMENTS

First, major symbols for use with the drawings are shown. 1 . . . moving picture/sound data, 2 . . . encryption key, 3 . . . encryption circuit, 4 . . . encrypted data, 5 . . . electronic watermark embedding circuit, 6 . . . electronic watermark embedded data, 7 . . . data recording apparatus, 8 . . . information recording medium, 9 . . . DVD, 10 . . . data reproducing apparatus, 11 . . . reproduced data, 12 . . . electronic watermark detection circuit, 13 . . . reproduced encryption key, 14 . . . decryption circuit, 15 . . . decrypted moving picture/sound data, 16 . . . disk fabrication process, 21 . . . first encryption key, 22 . . . second encryption key, 23 . . . encryption key generating circuit, 24 . . . third encryption key, 25 . . . reproduced second encryption key, 26 . . . encryption key generating circuit, 27 . . . third encryption key, 31 . . . first decryption key 1, 32 . . . reproduced second decryption key, 33 . . . decryption key generating circuit, 34 . . . decryption key combining/generating circuit, 41 . . . first decryption key, 42 . . . second decryption key, 43 . . . decryption key dividing circuit, 44 . . . reproduced second decryption key, 45 . . . decryption key combining/generating circuit, 46 . . . reproduced first decryption key, 51 . . . encryption key, 62 . . . second decrypted data, 205 . . . electronic watermark embedding circuit, 206 . . . electronic watermark embedded data, 217 . . . copyright management data including reproduction condition control information, etc., 218 . . . reproduced copyright management data, 219 . . . control circuit, 220 . . . moving picture/sound signal, 319 . . . transmission path, 320 . . . data transmission apparatus, 321 . . . data receiving apparatus, 322 . . . image display and/or sound output apparatus.

First Embodiment

Figure 1:
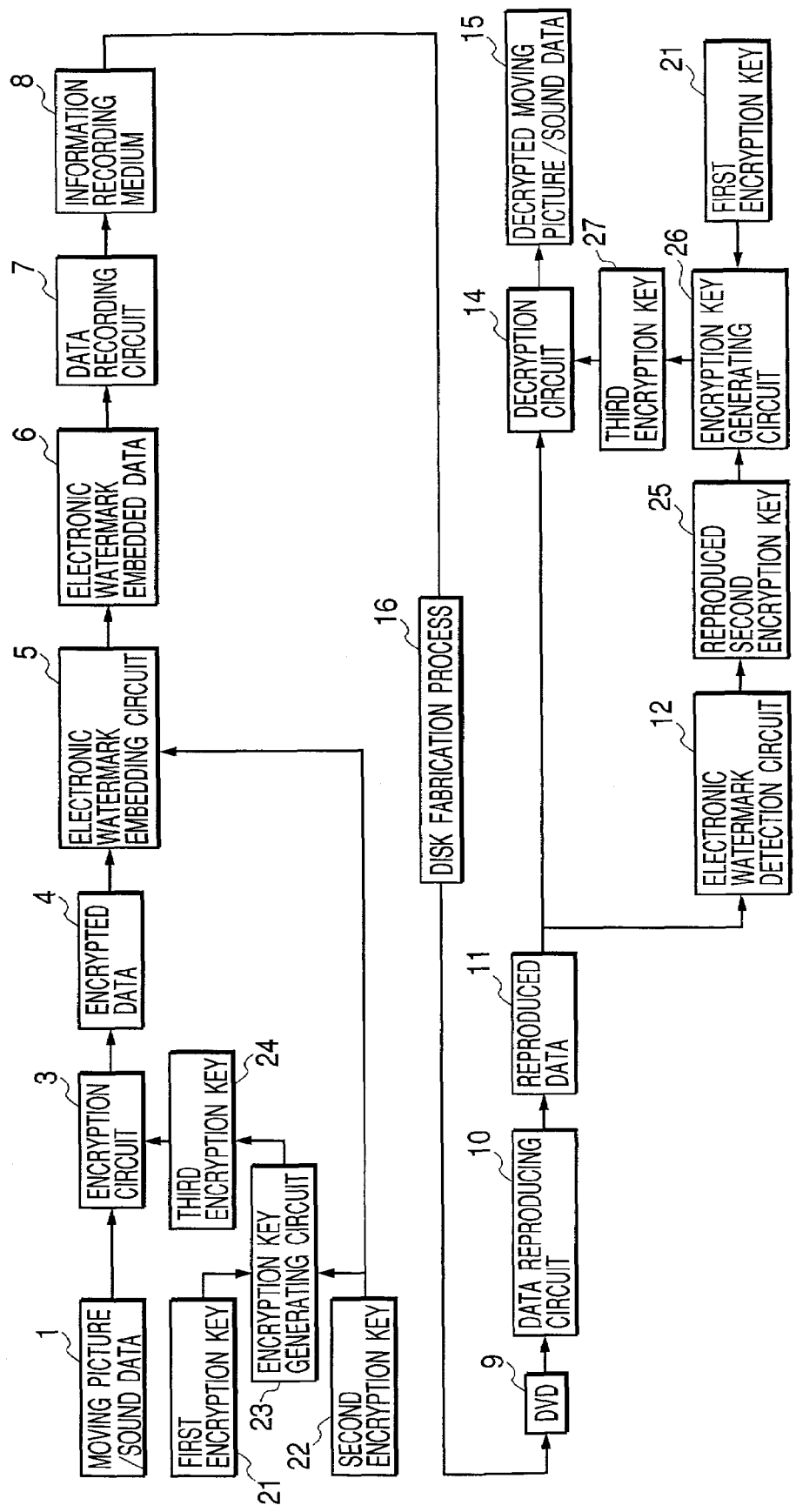
FIG. 1 is a view showing a first embodiment.

FIG. 1 shows the first embodiment. In this case, for data targeted for encryption, moving picture information is used, and a case where this information is accumulated in an optical disk (in the following description, since information in which moving picture information is recorded will be described as one example, referred to as "DVD") to be referred to as DVD-ROM (Digital Versatile Disk-Read Only Memory) as an information recording medium will be exemplified for description.

In FIG. 1, reference numeral 1 designates moving picture/sound data which is not an encrypted data; sound 21, a first encryption key for encrypting the moving picture/sound data 1; 22, a second encryption key for encrypting the moving picture/sound data 1; 23, an encryption key generating circuit (although generally the encryption key for encrypting data and the decryption key for decrypting encrypted data do not coincide with each other, the description will be made as the encryption key and the decryption key being the same for simplification in the following description) which generates a third encryption key 24 for encrypting the moving picture/sound data 1 from the first encryption key 21 and the second encryption key 22; 3, an encryption circuit for encrypting the moving picture/sound data 1 through the use of the third encryption key 24; 4, encrypted data obtained by encrypting by means of the encryption circuit 3; 5, an electronic watermark embedding circuit for embedding the second encryption key 22 in the encrypted data 4 as electronic watermark data; 6, electronic watermark embedded data in which the second encryption key 22 has been embedded by the electronic watermark embedding circuit 5 as an electronic watermark; 7, a data recording apparatus for recording the electronic watermark embedded data 6 on the information recording medium 8; 8, an information recording medium for fabricating a DVD; 16, a process such as an authoring process, a pre-mastering process, preparation of a stamper, and manufacture of a disk; 9, a DVD prepared by the process 16; 10, a data reproducing apparatus for reproducing the data from DVD 9; 11, data reproduced by the data reproducing apparatus 10; 12, an electronic watermark detection circuit for detecting the electronic watermark data from the data 11; 13, a second encryption key embedded as electronic watermark data, and decrypted by the electronic watermark detection circuit 12; 25, a second encryption key detected by electronic watermark detection circuit 12; 26, an encryption key generating circuit for generating a third encryption key 27 from the first encryption key 21 and the second encryption key 25; 14, a decryption circuit for decrypting the encrypted data 11 through the use of the third encryption key 27; and 15, the moving picture/sound data obtained by decryption by means of the decryption circuit 14.

In this respect, in actual fabrication of the DVD disk, various operations are required in addition to the process 16, but since these operations have nothing to directly do with the present invention, description thereof will be omitted. Also, in the actual DVD playback, the data is normally of the MPEG2 format, and in order to make it possible to look at and listen to it, there is required processing including: a decoding process of image/sound signal of the MPEG2 data; output of the image signal to a display for displaying the image signal after the decoding; output of sound signals to an audio device for outputting the sound signal after the decoding through a speaker or the like. Since, however, these have nothing to directly do with the present invention, description thereof will be omitted. Further, since the present invention has nothing to directly do with the electronic watermark system itself, a specific electronic watermark system which has been put to practical use will not be specifically described, and description concerning the electronic watermarked algorithm and mask data has been omitted.

In the present embodiment, as data to be inputted, data of books which should be prevented from being illegally plagiarized by a third person, for example, moving picture data and sound data such as movies and music are assumed. These data are converted from a base band signal to the MPEG2 format suitable for recording by means of the MPEG2 format conversion circuit (not shown). The moving picture/sound data 1 converted to the MPEG2 format is inputted into the encryption circuit 3 as non-encrypted data. The first encryption key 21 and the second encryption key 22 are inputted into the encryption key generating circuit 23, where the third encryption key 24 is generated. The data 1 and the third encryption key 24 are inputted into the encryption circuit 3, from which the encrypted data 4 thus encrypted is outputted. The encrypted data 4 is inputted into the electronic watermark embedding circuit 5. Also, into the electronic watermark embedding circuit 5, the second encryption key 22 is also inputted as data (hereinafter, referred to as "payload data") embedded as the electronic watermark. In the electronic watermark embedding circuit 5, the payload data inputted is converted into mask data corresponding thereto by means of a predetermined algorithm. The mask data causes minute changes to the encrypted data 4 by a predetermined algorithm in response to the encrypted data 4 inputted. As a result, the second encryption key 22 is embedded into the encrypted data 4 as the electronic watermark to output the electronic watermark embedded data 6.

The electronic watermark embedded data 6 is inputted into the data recording apparatus 7 to be recorded in the information recording medium 8. The process 16 fabricates a DVD 9 from the information recording medium 8, and in many cases, a plurality of DVD 9 are fabricated for commercial purpose.

The DVD 9 thus fabricated is mounted onto the data reproducing apparatus 10 for looking and listening to reproduce the data. The reproduced data 11 outputted from the data reproducing apparatus 10 has been encrypted, and a portion of the encryption key required for decryption, that is, the second encryption key 22 has been embedded in the data 11 as the electronic watermark. For the reason, in order to first obtain the second encryption key 22, the data 11 is inputted into the electronic watermark detection circuit 12. The electronic watermark detection circuit 12 detects the electronic watermark to output the second encryption key 25 restored as the payload data from the data 11 inputted. In this case, if the electronic watermark embedding circuit 5 conforms to the electronic watermark detection circuit 12, the second encryption key 22 will be equal to the second encryption key 25 restored. In order to decrypt the cryptogram, an encryption key when encrypted, that is, a key which is equal to the third encryption key 24 is required. For the reason, the encryption key generating circuit 26 generates the third encryption key 27 from the first encryption key 21 inputted from an external system (such as, for example, a reproducing apparatus for reproducing a recording medium in which the first encryption key has been recorded, or a receiving apparatus for receiving the first encryption key) and the second encryption key restored. In order to decrypt the cryptogram through the use of the third encryption key 27 thus obtained, the data 11 and the third encryption key 27 are inputted into the decryption circuit 14. The decryption circuit 14 decrypts the cryptogram to output the moving picture/sound data 15 whose cryptogram has been decrypted. As a result, data substantially equal to the moving picture/sound data 1 before encrypted can be obtained.

Like the example described above, the data targeted for protection by implementing the present invention will be protected by two methods: encrypting the target data, and providing the decryption key with an electronic watermark. It becomes possible to perform more strong data protection than the conventional data protection for the following reasons: generally, the electronic watermarked algorithm is not opened to the public; the electronic watermark detection key is scattered in data in that the electronic watermark is embedded in data in which the electronic watermark has been embedded in terms of time and space, and is often time-deformable; the electronic watermark data to be embedded is difficult to detect unless the data before the electronic watermark is embedded is compared with the data after the electronic watermark is embedded in detail; normally even the existence of the electronic watermark data cannot be detected; and further the encrypted data cannot be decrypted only with the encryption key embedded as the electronic watermark, but the encrypted data cannot be decrypted unless an encryption key to be separately distributed is acquired.

Also, since a decryption key required to decrypt the data targeted for protection, and an encryption process given to the data, or one portion of the decryption key has been embedded as the electronic watermark, a reproduction apparatus without the electronic watermark detection circuit is incapable of detecting the necessary decryption key, and it becomes impossible to decrypt the encrypted data. In other words, in order to reproduce a DVD according to the present embodiment, an electronic watermark detection circuit becomes indispensable to acquire the decryption key, and the reproduction apparatus without the electronic watermark detection circuit is incapable of reproducing the DVD, and therefore, loses the market value, and can be expected to be excluded from the market.

In the foregoing, in the present embodiment, the description has been made by exemplifying a case where moving picture information is recorded on the DVD, but the data targeted for encryption is not limited to the moving picture information, but still image information, sound information, text information and information obtained by combining these may be used. Also, a medium for storing data is not limited to the DVD, but an optical disk recording apparatus for CD-R, CD-RW, DVD-R, DVD-RW, DVD-RAM, DVD+RW, a magneto optical disk and the like, a data recording apparatus including a magnetic recording device and the like, a semiconductor memory apparatus for a memory card and the like, and any combinations of those may be used.

In this case, the encryption method to be used in the present invention is not limited to a specific encryption method such as the above-described CPRM and CPPM, but general encryption method can widely be applied. Further, the electronic watermark for use with the present invention is not limited to a specific method, but a general electronic watermark form can be applied.

In this respect, in the present embodiment, the description has collectively been made of: generation of encrypted data; embedding of an encryption key by means of the electronic watermark; recording of the encrypted data; an information recording medium recorded; copying of the information recording medium; and reproduction of the information from the information recording medium thus copied, but apparatuses and circuits for the above-described processing are normally divided. Hereinafter, the description will be made of one example of the divided form.

Figure 2:
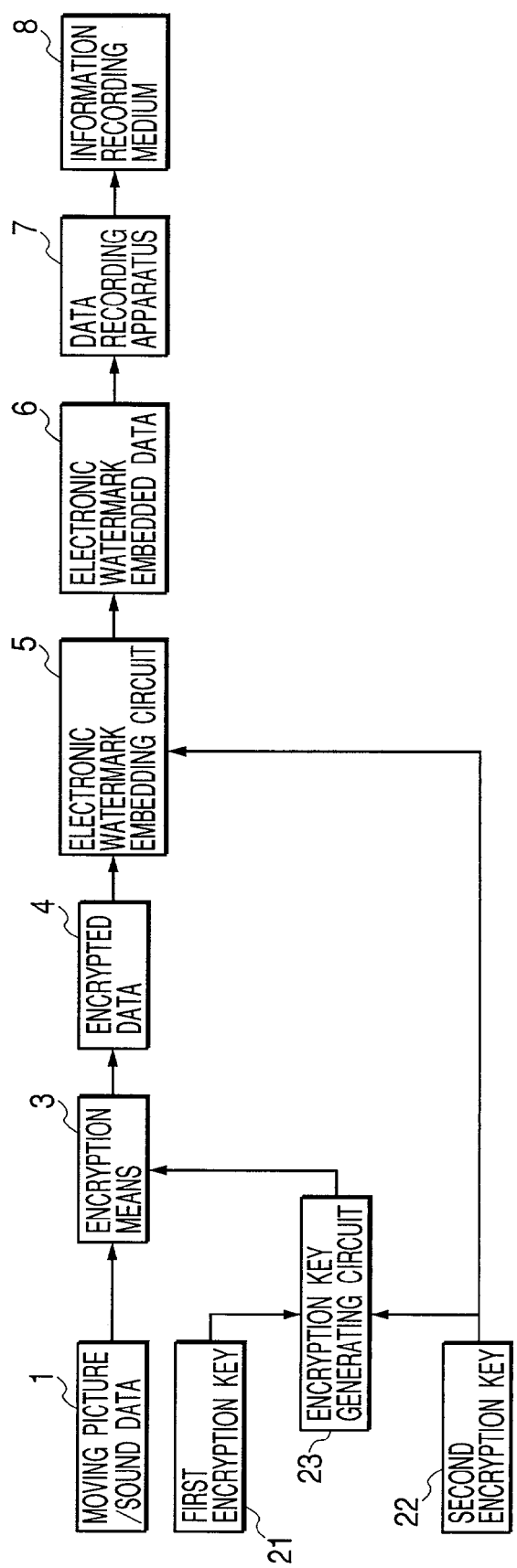
FIG. 2 is a view showing an encrypted data recording apparatus according to the first embodiment.

FIG. 2 is a view for explaining an information recording apparatus necessary for fabricating the information recording medium 8. As described above, the moving picture/sound data 1, that is not an encrypted data, is encrypted by the encryption circuit 3 through the use of the third encryption key 24 to become encrypted data 4, and the second encryption key 22 is embedded in this encrypted data 4 by the electronic watermark embedding circuit 5 to prepare the electronic watermark embedded data 6. This electronic watermark embedded data 6 is recorded in the information recording medium 8 through the use of the data recording apparatus 7, whereby the information recording medium 8 in which the information has been recorded in a desired form can be obtained.

A series of processes for fabricating DVD have conventionally been performed in limited video mastering facilities for commercial use, and we think that a process for fabricating the DVD 9 according to the present invention should be also performed in the same equipment as before because the process has the same object as the conventional DVD mastering. Accordingly, we think that the information recording apparatus shown in FIG. 2 should be one kind of the commercial-use video mastering apparatus for specified engineers.

Also, in the disk fabrication process 16, a predetermined process is performed with an information recording medium 8 as a master disk to obtain a DVD 9, which is a copy of the information recording medium 8. In this case, since the process in the disk fabrication process 16 has generally nothing to do with the information recorded in the information recording medium 8, it can be the same as the disk fabrication process in the conventional DVD fabrication. In this respect, since in order to fabricate the disk, equipment for exclusive use one required in disk cutting, making of die, injection molding and the like, it is usually performed in the exclusive factory.

Next, with reference to FIG. 3, the description will be made of an information reproducing apparatus necessary for reproducing the DVD 9. Data 11 reproduced from the DVD 9 by the data reproducing apparatus 10 is inputted into the electronic watermark detection circuit 12 to output a reproduced second encryption key 25. In the encryption key generating circuit 26, the reproduced second encryption key 25 and the first encryption key 21 inputted from the external system are inputted to generate a third encryption key 27. The decryption circuit 14 decrypts the reproduced data 11 separately inputted through the use of the third encryption key 27 to obtain decrypted moving picture/sound data 15. This decrypted moving picture/sound data 15 is inputted into the image/sound outputting apparatus (not shown) to output the image/sound, whereby the objective image/sound information can be looked and listened.

The DVD has conventionally been fabricated in order for an individual to look and listen in a home or the like, and a DVD player for that purpose is mounted with a DVD for a reproducing operation, whereby image/sound signals are outputted from the output terminal of the DVD player and this is connected to the signal input terminal of a television set or the like so that the DVD is adapted to be able to be looked and listened. Since the information reproducing apparatus for reproducing the DVD 9 according to the present invention has also the same object as the DVD player, we think that it should be an apparatus having the same form and style as before. Accordingly, we think that the information reproducing apparatus in FIG. 3 should have the form and style of equipment for the consumer use, as one kind of DVD player. Further, since the DVD 9 is the same as the conventional DVD in manufacturing process and usage as described above, it is reasonable that the DVD 9 is fabricated so as to have the same form and style as the conventional DVD.

In this respect, In the present embodiment, the first encryption key 21 to be inputted into the encryption key generating circuit 23 when embedding the data and the encryption key 21 to be inputted into the encryption key generating circuit 26 when reproducing the data are the same, but it is assumed that the former is managed by the manufacturer of the DVD 9 and the latter is managed by the reproducer (general user). In other words, when the DVD 9 is reproduced, it is necessary that the reproducer acquires the first encryption key to be managed by the manufacturer to input this into the encryption key generating circuit 26.

Hereinafter, the description will be made of a method for obtaining the first encryption key to input this into the encryption key generating circuit 26.

The first method is of a form and style in which the manufacturer attaches the data of the first encryption key to the DVD 9. In this form and style, when only the DVD 9 has been plagiarized, correct decryption by the decryption circuit 14, that is, reproduction cannot be performed for a person having no first decryption key, and therefore, there is an advantage that it is easy to prevent the data 1 from being illegally plagiarized. This method can be said to be a method for performing restriction on decryption (restriction on reproduction) by pass word attached to the disk for the reproduction of the DVD 9.

A second method is of a form and style in which the manufacturer attaches, to the DVD 9, information of a person from whom the encryption key is acquired, in advance, the reproducer asks the person to send the encryption key after obtaining the DVD 9, and the manufacturer distributes the data of the first encryption key in response to the request from the reproducer.

This form and style has further the following advantages in addition to the advantage of the first method. That is, (1) since it is possible to allow the reproducer to provide his information when asking to send the encryption key, the reproducer can be specified; (2) even when the first decryption key illegally leaks, the decryption key is changed for each reproducer in advance, whereby the course of the leaking can be easily specified; (3) rights to be given to reproducers, such as a number of times that looking and listening can be made, the authorized/unauthorized copying, and restriction on a period of time during which looking and listening can be made can be set for each reproducer; and other advantages.

Also, in the present form, a process in which the reproducer asks the manufacturer to send the encryption key and a process in which the data of the encryption key distributed from the manufacturer is inputted into the decryption key combining/generating circuit are recorded in the DVD 9 in advance, and when the reproducer mounts the DVD 9 to a reproduction system having a communication function, setting is made so as to start the processes, whereby in the present form, it becomes possible to substantially automate acquisition of the decryption key necessary before reproduction and process of inputting into the reproduction system. Therefore, there is an advantage that it is possible to reduce labor and time required at the time of initial reproduction. Also, in an environment in which substantially automated processing can be performed, the reproducer further performs the above-described processes every time the reproducer reproduces the DVD 9, and the decryption key to be sent at that time is made valid only in a predetermined number of times or for a predetermined period of time in advance, whereby it becomes possible for the manufacturer to send the decryption key in response to the reproducer's request for permitting the reproduction. Thus, since it is possible to send not only a permanently-usable key, but also a decryption key restricted to a predetermined number of times or period of time, there is an advantage that it becomes possible to reproduce in the form and style that more meet the reproducer's request.

Next, the description will be made of relationship between the first encryption key and the second encryption key according to the present embodiment.

One of the objects for using the first encryption key is to send the encryption key separately from the DVD 9, and the advantage is as described above. Also, one of the objects for using the second encryption key is to embed this in the DVD 9 as an electronic watermark and to transmit it together with the data for thereby preventing reproduction in equipment having no electronic watermark detection function. Accordingly, the first encryption key and the second encryption key can be set independently in specifications such as form and style, method and length, and in extreme cases, it is also possible to set so as to delete either or both encryption keys. In this case, the above-described advantage of the encryption key deleted may be lost, but the manufacturer is capable of freely selecting any of the encryption methods. For example, when the first encryption key is not used, inquiry to the manufacturer concerning the first encryption key becomes unnecessary, and as a result, while there is an advantage that reproduction in equipment having no electronic watermark detection function can be prevented, reproduction without limitation is allowed as in the case of the conventional DVD on the market on the other hand.

Second Embodiment

Figure 4:
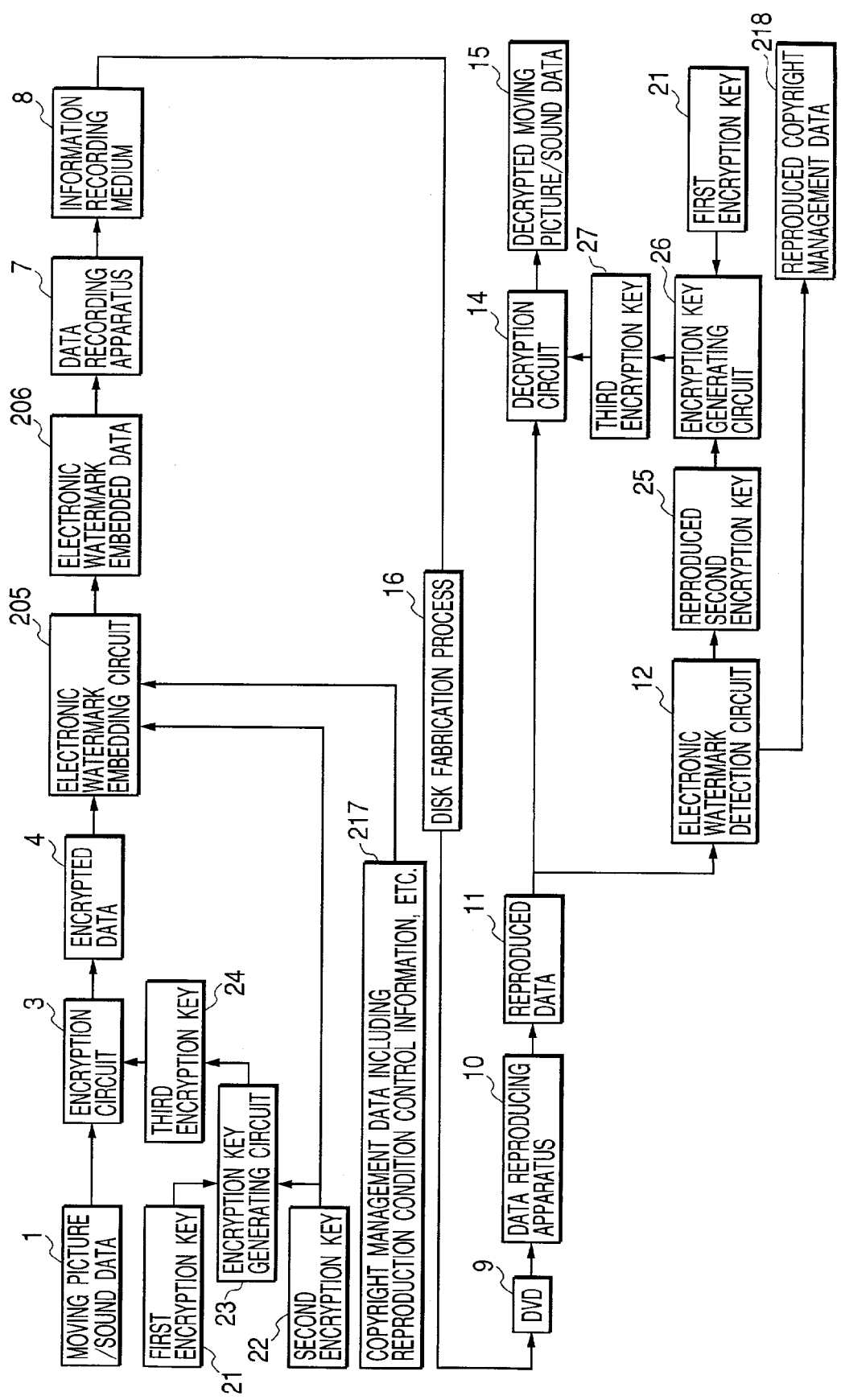
FIG. 4 is a view showing a second embodiment.

FIG. 4 shows a second embodiment obtained by developing the first embodiment. Of the present embodiment, portions identical to those in the first embodiment are designated by the identical reference numerals and description thereof will be omitted. Different portions will be described.

In FIG. 4, a reference numeral 217 designates copyright management data including reproduction condition control information and the like of moving picture/sound data 1; 205, an electronic watermark embedding circuit for embedding the second encryption key 22 and the copyright management data 217 in the encrypted data 4 as electronic watermark data; 206, electronic watermark embedded data in which the second encryption key 22 and the copyright management data 217 have been embedded by the electronic watermark embedding circuit 5 as an electronic watermark; and 218, copyright management data embedded as the electronic watermark data, and restored by the electronic watermark detection circuit 12. In this case, as a specific example of copyright management data including reproduction condition control information and the like, there are given various data such as: the authorized/unauthorized copying; a period of time/time limit for permitting/prohibiting copying; a period of time/time limit for enabling looking and listening; a format in which copying is allowed/not allowed; and copyright holders.

In the present embodiment, the copyright management data 217 is added to the data to be inputted as data accompanying the moving picture/sound data 1. Also, the second encryption key 22 and the copyright management data 217 are embedded in the encrypted data 4 by the electronic watermark embedding circuit 205. Also, the copyright management data 218 is added to the electronic watermark data to be outputted from the electronic watermark detection circuit 12, and the encryption key 13 and the copyright management data 218 are restored by the electronic watermark detection circuit 12.

Since the second encryption key 22 and the copyright management data 217 are integrally embedded in the encrypted data 4 by the electronic watermark embedded circuit 205 and the encryption key 13 and the copyright management data 218 are also integrally restored from the electronic watermark detection circuit 12, the data in which the electronic watermark has been embedded is processed, whereby only the copyright management data cannot be tampered with without affecting the encryption key. According to the present embodiment, the copyright management data can also be protected from illegal tampering.

The decrypted moving picture/sound data 15 is controlled in terms of, for example, permission/prohibition to reproduce an image, permission/prohibition to copy, and the like on the basis of the reproduction condition control information included in the copyright management data 218. For the reason, both will be sent to a control circuit (not shown) for performing the control.

As described above, in the present embodiment, when data in which the electronic watermark has been embedded is tampered with such that the electronic watermark intentionally cannot be detected with the aim of circumventing the restriction on the reproduction method based on the electronic watermark detection result in addition to the effect described in the first embodiment, it becomes impossible to detect also an encryption key necessary for decryption the encrypted data at the same time, and as a result, the data cannot be correctly reproduced, and therefore this tampering conduct of the data does not make sense. Thus, it is possible to prevent any conduct for tampering with data in which the electronic watermark has been embedded with the aim of circumventing the restriction on the reproduction based on the electronic watermark detection result.

In this respect, as in the case of the first embodiment, in the present embodiment, the description has collectively been made of: generation of encrypted data; embedding of an encryption key and the copyright management data by means of the electronic watermark; recording of the encrypted data; an information recording medium recorded; copying of the information recording medium; and reproduction of the information from the information recording medium thus copied; decryption of the data reproduced; and the like, but apparatuses and circuits for the above-described processing are normally divided. Hereinafter, the description will be made of one example of the divided embodiment.

Figure 5:
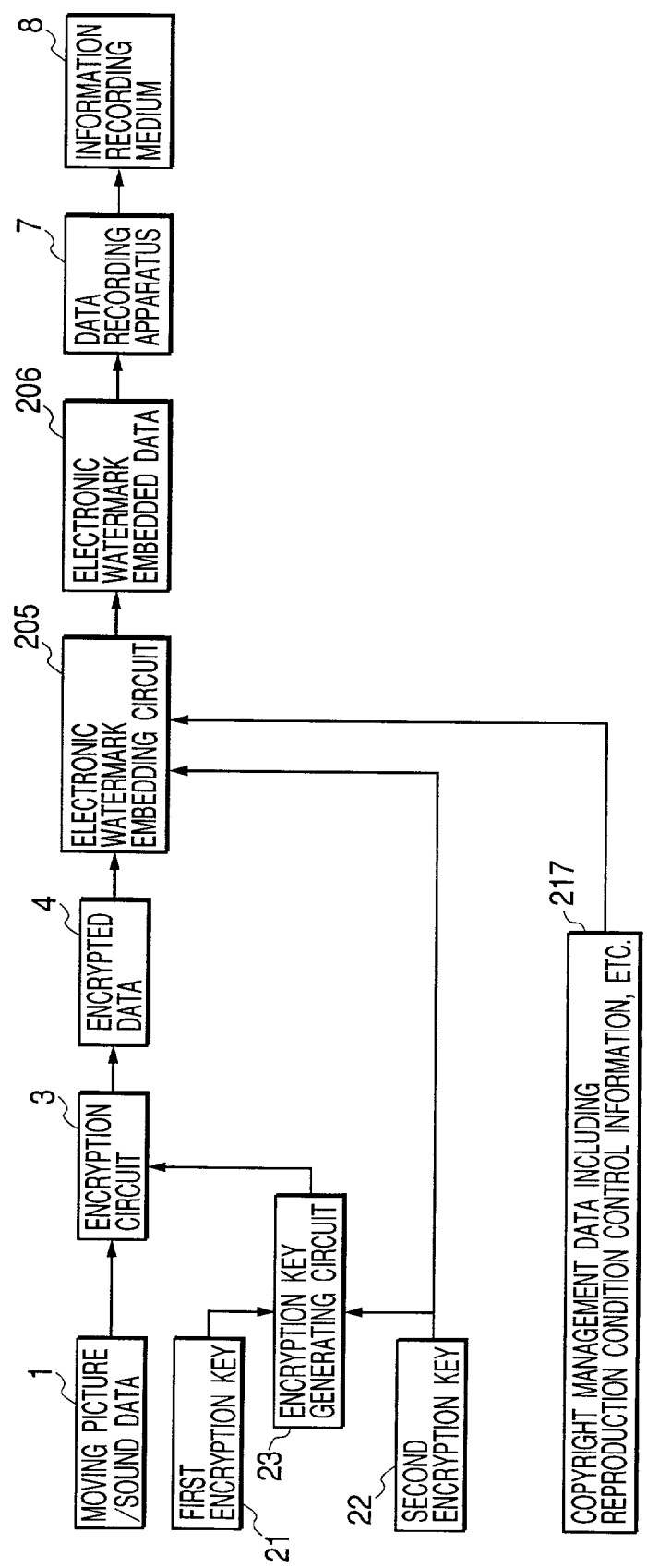
FIG. 5 is a view showing an encrypted data recording apparatus according to the second embodiment.

FIG. 5 is a view for explaining an information recording apparatus necessary for fabricating the information recording medium 8. As described above, the moving picture/sound data 1, that is not an encrypted data, is encrypted by the encryption circuit 3 using the third encryption key 24 to become encrypted data 4, and the second encryption key 22 and the copyright management data 217 are embedded in this encrypted data 4 by the electronic watermark embedded circuit 205 to prepare the electronic watermark embedded data 206. This electronic watermark embedded data 206 is recorded in the information recording medium 8 through the use of the data recording apparatus 7, whereby the information recording medium 8 in which the information has been recorded in a desired mode can be obtained.

As in the case of the description of FIG. 2, a series of processes for fabricating DVD have conventionally been performed in a limited video mastering equipment for commercial-use, and we think that a process for fabricating the DVD 9 according to the present invention should be also performed in the same equipment as before because the process has the same object as the conventional DVD mastering. Accordingly, we think that the information recording apparatus shown in FIG. 5 should be one kind of the commercial-use video mastering equipment for specified engineers.

Also, in the disk fabrication process 16, a predetermined process is performed with the information recording medium 8 as a master disk to obtain a DVD 9, which is a copy of the information recording medium 8. In this case, since the process in the disk fabrication process 16 has generally nothing to do with the information recorded in the information recording medium 8, it can be the same as the disk fabrication process in the conventional DVD fabrication. In this respect, since in order to fabricate the disk, equipment for exclusive use are required in disk cutting, making of die, injection molding and the like, it is usually performed in the exclusive factory.

Figure 6:
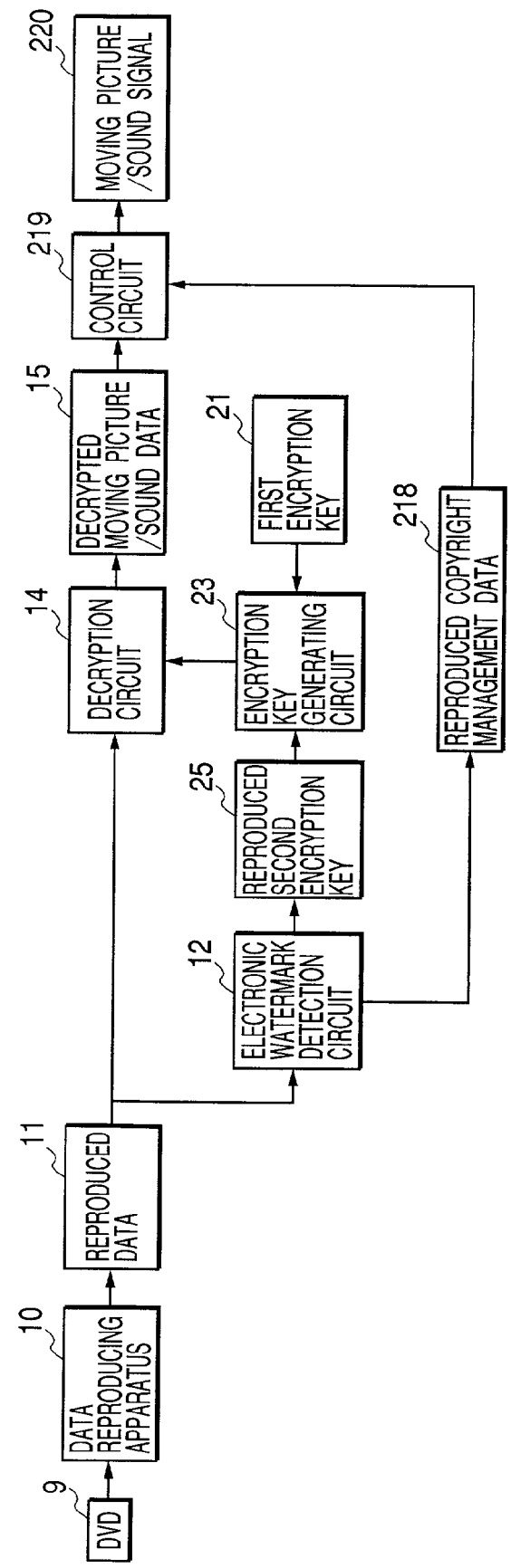
FIG. 6 is a view showing an information reproducing apparatus according to the second embodiment.

Next, with reference to FIG. 6, the description will be made of an information reproducing apparatus necessary for reproducing the DVD 9 according to the present embodiment. Data 11 reproduced from the DVD 9 by the data reproducing apparatus 10 is inputted into the electronic watermark detection circuit 12 to output a reproduced second encryption key 25. In the encryption key generating circuit 26, the reproduced second encryption key 25 and the first encryption key 21 inputted from the outside are inputted to generate a third encryption key 27. The decryption circuit 14 decrypts the reproduced data 11 separately inputted through the use of the third encryption key 27 to obtain decrypted moving picture/sound data 15. Also, from the electronic watermark detection circuit 12, the copyright management data 218 is also restored, and the reproduced copyright management data 218 and the decrypted moving picture/sound data 15 are inputted into a control circuit 219 for controlling looking and listening.

When looking and listening are allowed by the control circuit 219, the moving picture/sound signal 220 is inputted into an image/sound output apparatus (not shown) to output the image/sound, whereby it is possible to look at and listen to the object.

Figure 3:
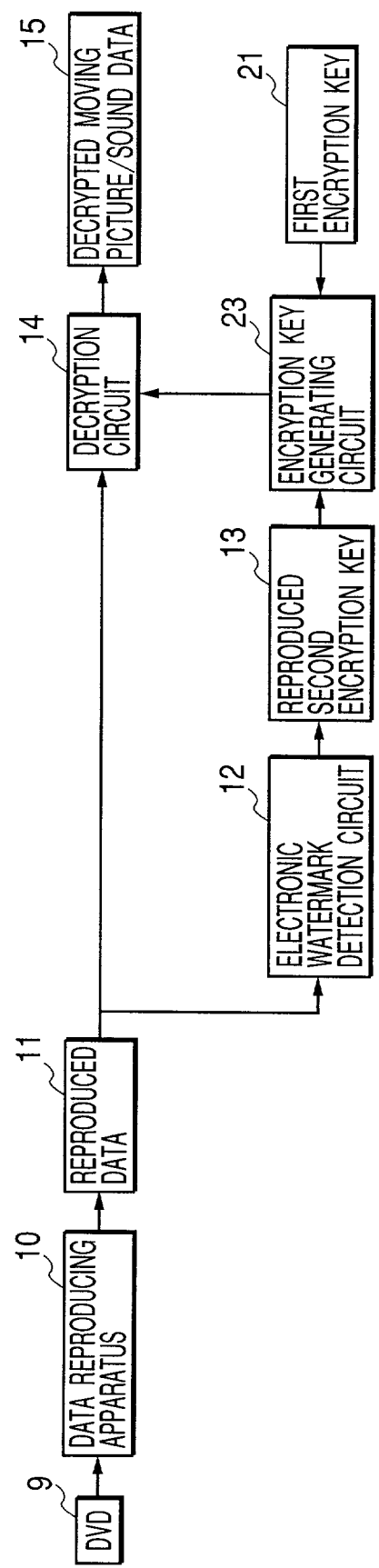
FIG. 3 is a view showing an information reproducing apparatus according to the first embodiment.

As in the case of the description of FIG. 3, the DVD has conventionally been fabricated in order for an individual to look and listen in a home or the like, and a DVD player for that purpose is mounted with a DVD for a reproducing operation, whereby image/sound signals are outputted from the output terminal of the DVD player and this is connected to the signal input terminal of a television set or the like so that the DVD is adapted to be able to be looked and listened. Since the information reproducing apparatus for reproducing the DVD 9 according to the present invention has also the same object as the DVD player, we think that it should be equipment having the same form and style as before. Accordingly, we think that the information reproducing apparatus shown in FIG. 6 should have the form and style of equipment for the consumer use targeted for the use in a home as one kind of DVD player. Further, since the DVD 9 is the same as the conventional DVD in manufacturing process and usage as described above, it is reasonable that the DVD 9 is fabricated so as to have the same form and style as the conventional DVD.

Third Embodiment

Figure 7:
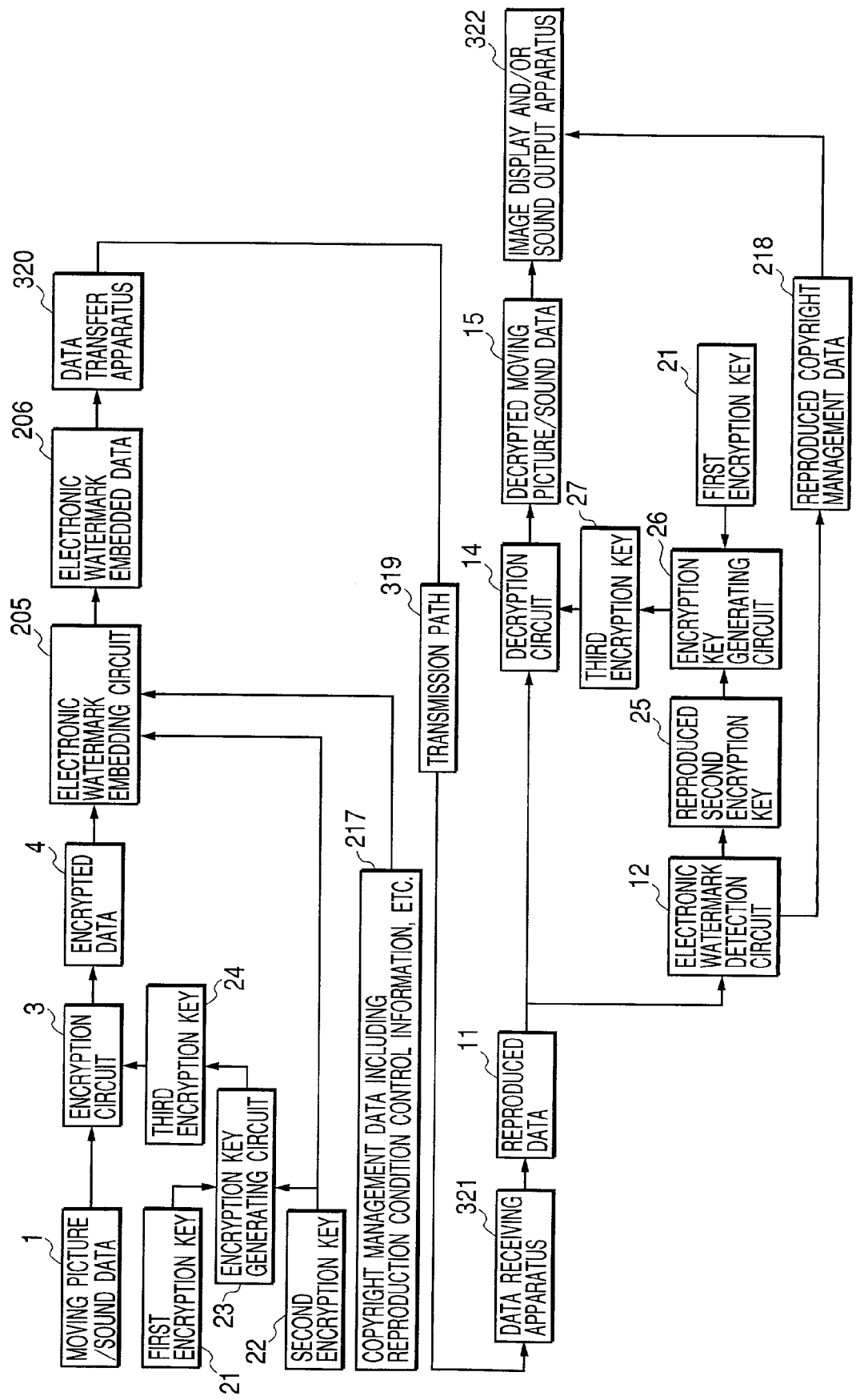
FIG. 7 is a view showing a third embodiment.

FIG. 7 shows a third embodiment which is an application of the second embodiment. Of the present embodiment, portions identical to those in the second embodiment are designated by the identical reference numerals and description thereof will be omitted. Different portions will be described.

In FIG. 7, a reference numeral 319 designates a transmission path for transmitting the electronic watermark embedded data 206; 320, a data transfer apparatus for transferring the electronic watermark embedded data 206 to the transmission path 319; 321, a data receiving apparatus for receiving the electronic watermark embedded data 6 from the transmission path 319; 218, the copyright management data embedded as the electronic watermark data, and restored by the electronic watermark detection circuit 12; and 322, an image display and/or sound output apparatus for looking at and listening to the decrypted moving picture/sound data 15. In this case, as a specific example of copyright management data including reproduction condition control information and the like, there are given various data such as: the authorized/unauthorized copying; a period of time/time limit for permitting/prohibiting copying; a period of time/time limit for enabling looking and listening the copy; a format in which copying is allowed/not allowed; and a copyright holder, a broadcasting right holder, a broadcasting/allotting station, broadcasting/allotting date and time, a broadcasting/allotting area, the authorized/unauthorized rebroadcasting, the authorized/unauthorized retransmission using CATV and the like, an allotting method to the broadcasting/allotting station, information of the opposite party in broadcasting/allotting.

In the second embodiment, the electronic watermark embedded data 206 has been recorded in the information recording medium, and this information recording medium has physically moved to carry the data, but in the present embodiment, the electronic watermark embedded data 206 is transmitted through wire and/or radio transmission path. Any transmission path 319 may be used as long as it is capable of performing communication or broadcasting to a specified opposite party, or broadcasting to an indefinite number of listeners, and not only radio transmission, but also wire transmission such as CATV or Internet or on-demand transmission using their combination may be used.

As a special feature peculiar to the present embodiment, the form of input of the data transfer apparatus 320 is matched with the form of the transmission path 319, whereby the reproduced data 11 to be outputted from the data receiving apparatus 321 can be made into the same format irrespective of the form of the transmission path 319. As a result, the data whose copyright has been protected can be transferred by a method with high safety in which there is less possibility of being illegally plagiarized, and therefore, it can be made into an information transmission method having high general-purpose properties.

Also, normally physical distances are put before and after the transmission path 319, and after the transmission path 319, a data reproducing form housed in one housing, having similar form and style to, for example, a television set is generally constructed, but the present invention is not limited thereto. Since a functional block after, for example, the transmission path 319 is divided into a plurality of housings to be housed, it is assumed that the housings are separated before and after, for example, the reproduced data 11. In this case, there are provided a circuit for connecting the data 11 to be outputted from the data receiving apparatus 321 to a display having one or more input terminals of the data 11, and a circuit for selecting one from the data 11 inputted into the display, and further functions of the electronic watermark detection circuit 12 and the decryption circuit 14 and after will be housed in the display. The present embodiment is constructed in this manner, whereby the display has a special feature that it can be used as an element for constructing an information receiving system having high general-purpose properties capable of receiving the data whose copyright has been protected by a method with high safety in which there is less possibility of being illegally plagiarized.

In this respect, in the present embodiment, the description has collectively been made of: generation of encrypted data; embedding of an encryption key and copyright management data by means of the electronic watermark; transfer of the encrypted data; transmission of the transferred data; reception of the encrypted data; reproduction of the received data; decryption of the reproduced data, and the like, but apparatuses and circuits for performing the above-described processing are normally divided. Hereinafter, the description will be made of one example of the divided embodiment.

Figure 8:
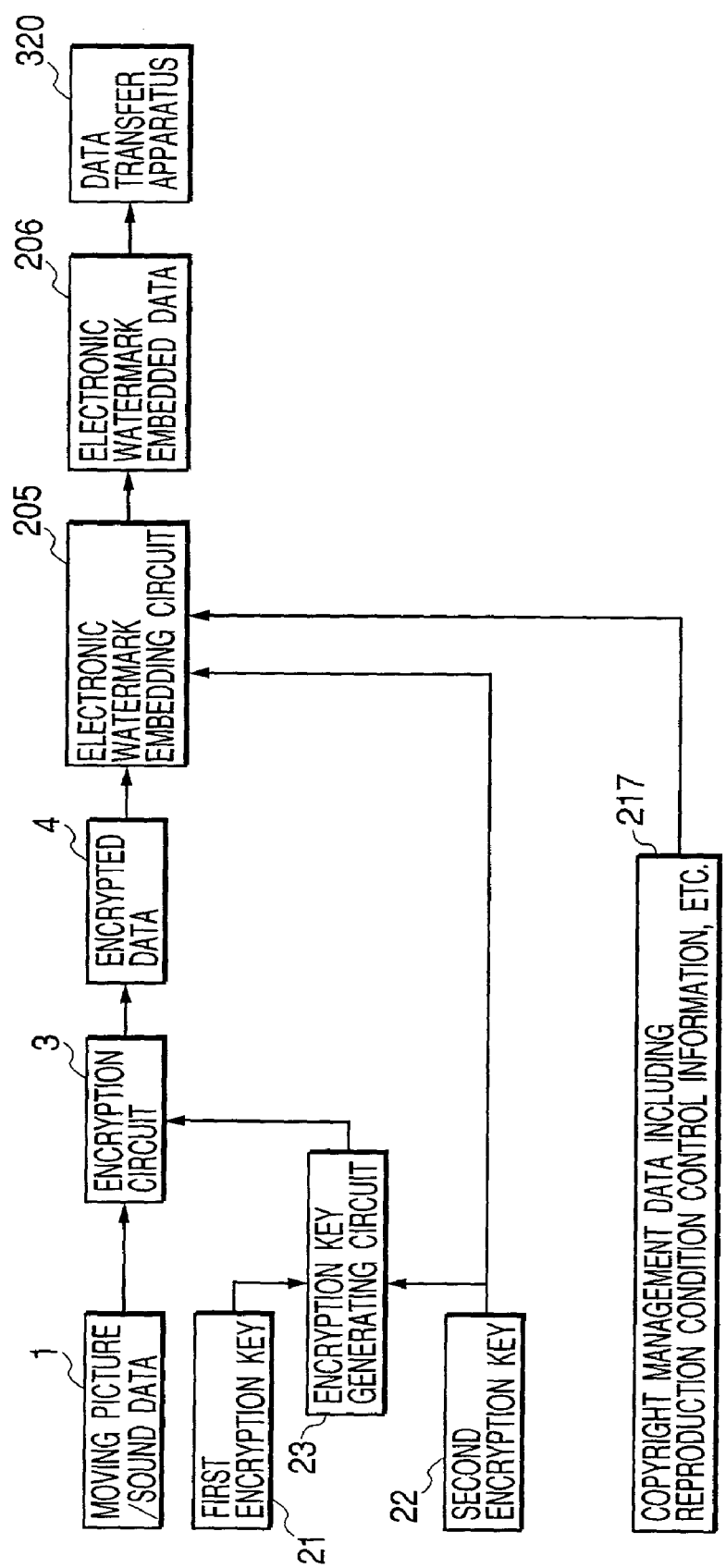
FIG. 8 is a view showing an encrypted data transfer apparatus according to the third embodiment.

FIG. 8 is a view for explaining an information transfer apparatus necessary for transferring to the transmission path after the above-described processing is given to the moving picture/sound data. As described above, moving picture/sound data 1 which is written in a non-encrypted data is encrypted by the encryption circuit 3 through the use of the third encryption key 24 to become encrypted data 4, and the second encryption key 22 and the copyright management data 217 are embedded in the encrypted data 4 by the electronic watermark embedding circuit 205 to prepare electronic watermark embedded data 206. This electronic watermark embedded data 206 is transferred to the transmission path 319 through the use of the data transfer apparatus 207, whereby the information can be transferred in a desired form.

Conventionally, a series of processing for transferring moving picture/sound information is usually performed in specific broadcasting or communication facilities, and the transfer process of the electronic watermark embedded data 206 according to the present invention has also the same object as the conventional broadcasting or communication, and therefore, we think that the processing is usually performed in specific facilities similar to the conventional case. Accordingly, we think that the information transfer apparatus shown in FIG. 8 has usually the form and style of equipment for commercial use targeted for the use by specified engineers as one kind of broadcasting/communication apparatus for commercial use.

On the other hand, in recent years in a communication system represented by Internet, the moving picture/sound information can be transmitted even by the personal computer system. The present embodiment has been described by exemplifying the broadcasting/communication equipment for commercial use, but the present invention is not limited to the application to the broadcasting/communication equipment for commercial use, but the present invention can be applied to a transmission system using personal computers.

Figure 9:
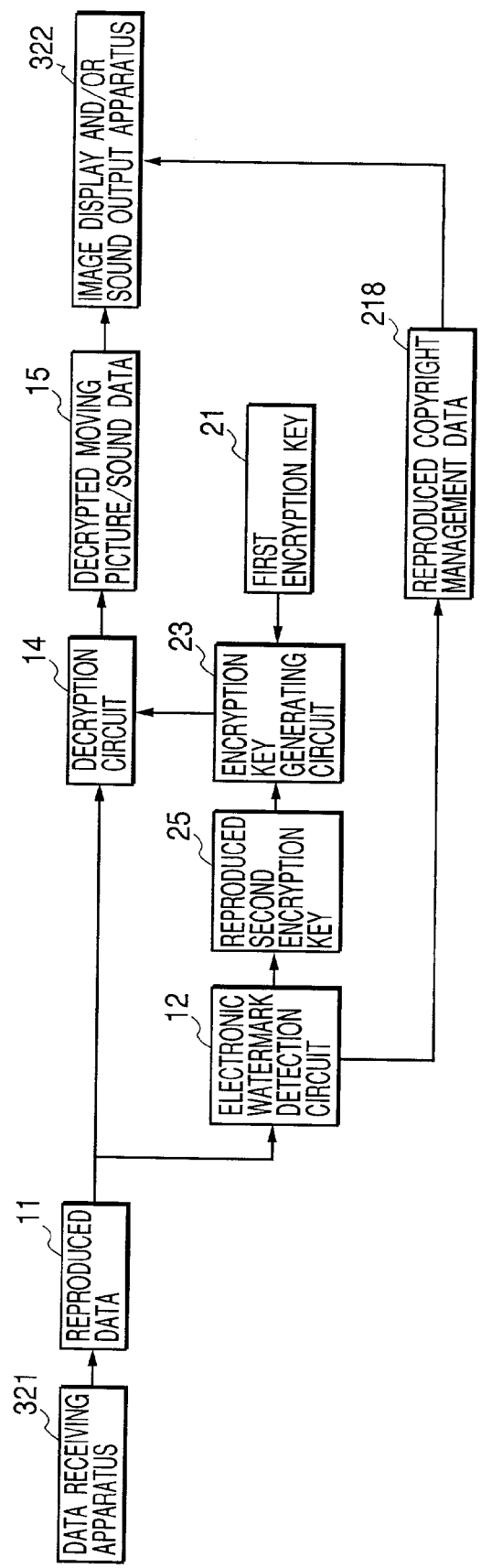
FIG. 9 is a view showing an information receiving apparatus according to the third embodiment.

Next, with reference to FIG. 9, the description will be made of an information reproducing apparatus necessary for reproducing the information transferred to the transmission path. Data 11 transferred from the transmission path 319 reproduced by the data receiving apparatus 321 is inputted into the electronic watermark detection circuit 12 to output a restored second encryption key 25 here. In the encryption key generating circuit 26, the reproduced second encryption key 25 and the first encryption key 21 inputted from the external system are inputted to generate a third encryption key 27. The decryption circuit 14 decrypts the reproduced data 11 separately inputted through the use of the third encryption key 27 to obtain decrypted moving picture/sound data 15. Also, from the electronic watermark detection circuit 12, the copyright management data 218 is also restored, and the reproduced copyright management data 218 and the decrypted moving picture/sound data 15 are inputted into the image display/sound output apparatus 322, and when the reproduced copyright management data 218 allows the reproduction of the decrypted moving picture/sound data 15, the object can be looked and listened by outputting the image and sound.

The moving picture/sound looking and listening apparatus such as the television set has conventionally been fabricated in order for an individual to look and listen in a home or the like, and a television set for that purpose is arranged so as to be able to look at and listen to the television by connecting an input signal of broadcast radio wave to the signal input terminal. Since the information reproducing apparatus according to the present invention has also the same object as the television set, we think that it should be equipment having the same form and style as before. Accordingly, we think that the information reproducing apparatus shown in FIG. 9 should have the form and style of equipment for the consumer targeted for the use in a home as one kind of television set. Also, since the information reproducing apparatus has the same usage as the conventional television set as described above, it is reasonable that the transmission path is fabricated so as to use the same form and style as the conventional television set, that is, broadcast wave, CATV or the like.

In this respect, in recent years, there is a form capable of looking at and listening to the television through such a computer system as Internet, and it is also conceivable that such a computer system as Internet is utilized as one form of the transmission path.

In this respect, the block configuration shown in the above-described embodiment has been described to be divided for each functional block for the sake of convenience in the description, and it is not always necessary to construct such that the individual blocks can be divided for each individual function, but it can be implemented by a processing apparatus obtained by making, for example, a plurality of functional blocks integral. It is essential that output and input of signals be implemented in the form and style that have been described in each embodiment.

Fourth Embodiment

FIG. 10 shows the fourth embodiment. The present embodiment describes in more detail a relation between the reproduced data 11, the third encryption key 27 and the reproduced copyright management data 218 on the basis of the first to third embodiments. Portions identical to those in the first to third embodiments are designated by the identical reference numerals and description thereof will be omitted. Different portions will be described.

FIGS. 10 and 11 are views schematically representing a relation between plural reproduced data 11, the third encryption key 27 and the reproduced copyright management data 218 in time sequence respectively.

In FIG. 10, the reproduced data 11 stands in a line in the order of 11A, 11B and 11C in time sequence. Also, the third encryption key 27 corresponding to 11A to 11C also stands in a line in the order of 27A, 27B and 27C in time sequence. Further, the reproduced copyright management data (hereinafter, abbreviated as copyright data) 218 corresponding to 11A to 11C also stands in a line in the order of 218A, 218B and 218C in time sequence.

Of a group consisting of the reproduced data 11, the third encryption key 27 and the copyright data 218, it is the copyright data 218 that appears earlier than any other one, it is the third encryption key 27 that appears next, and it is the reproduced data 11 that appears last.

A time difference is provided between the reproduced data 11 in this manner, the third encryption key 27 and the copyright data 218, whereby at timing t1, when the reproduced data 11A is being reproduced, the third encryption key 27B corresponding to the reproduced data 11B to be reproduced next prior to the reproduced data 11A can be obtained. Also, similarly, the copyright data 218B corresponding to the reproduced data 11B can be also obtained previously.

Thus, when detection time ts is required in the electronic watermark detection circuit 12 necessary for obtaining the third encryption key 27B and the copyright data 218B, a relation of time difference td in appearance of the third encryption key 27B to the reproduced data 11B is assumed to be ts<td, whereby since when the reproduced data 11B appears, the third encryption key 27B has been obtained, it becomes possible to ease constraints on processing time ts of the electronic watermark detection circuit 12 equivalently.

FIG. 10 shows one example, and a timing relation between the reproduced data 11, the third encryption key 27 and the copyright data 218 may be obviously set as shown in, for example, FIG. 11.

In this respect, in the present embodiment, the description has been made by exemplifying during reproduction, and it goes without saying that in order to perform such reproducing process, it is necessary to perform encryption process so as to form the above-described timing relation at the time of data encryption.

Fifth Embodiment

Figure 12:
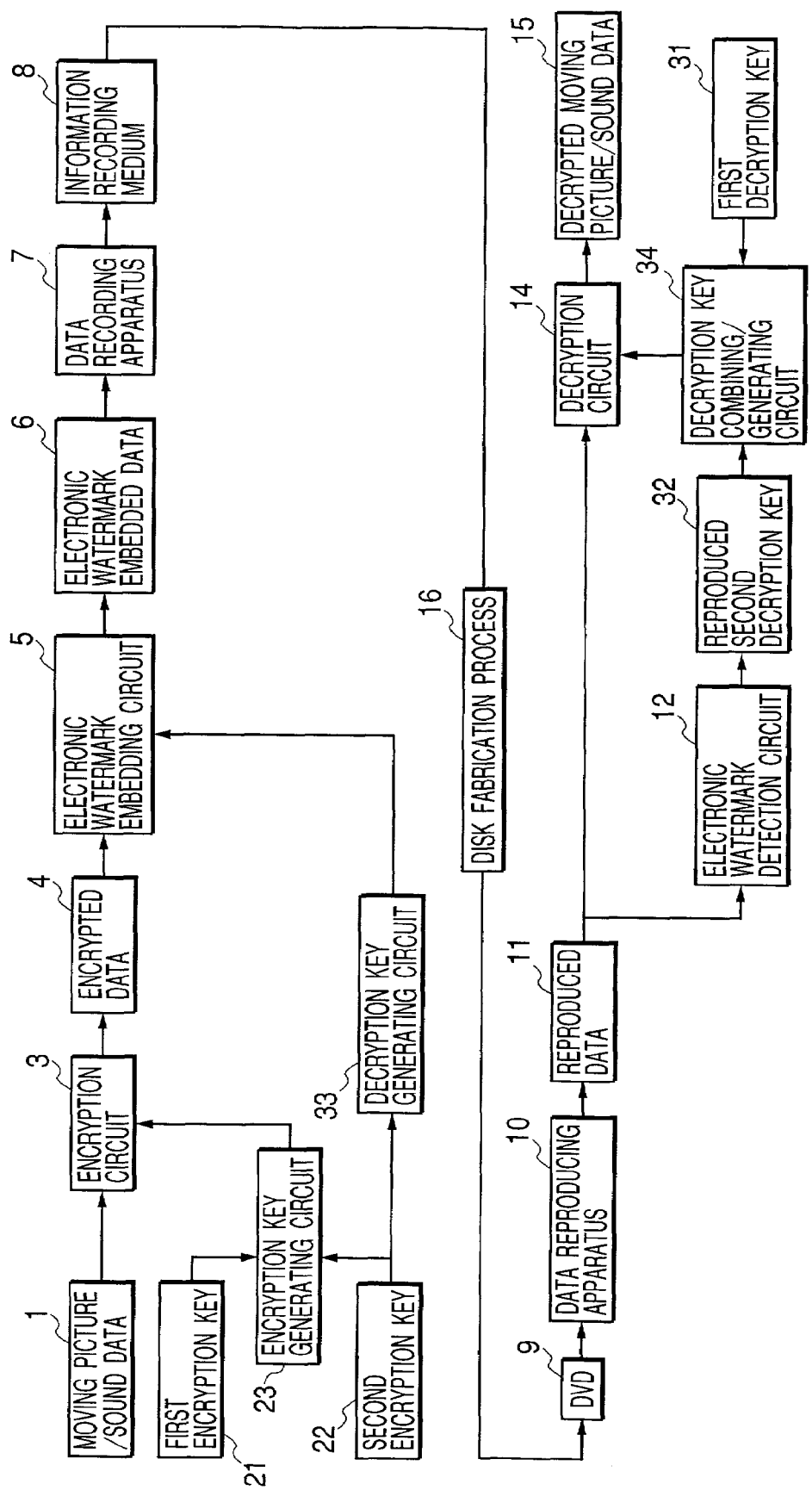
FIG. 12 is a view showing a fifth embodiment.

FIG. 12 shows the fifth embodiment. The present embodiment is similar to the first embodiment, but the point of difference between the first and fifth embodiments is that a case where the key to be used for decryption is different from the key to be used at the time of encryption is assumed. Portions identical to those in the above-described embodiment are designated by the identical reference numerals and description thereof will be omitted. Different portions will be described.

First, the data recording side will be described. The decryption key generating circuit 33 generates a second decryption key (not shown) from the second encryption key 22 inputted to output this to the electronic watermark embedding circuit 5. The electronic watermark embedding circuit 5 embeds the second decryption key inputted in the encrypted data 4 to output the electronic watermark embedded data 6.

Next, the description will be made of the data reproduction side. The reproduced second decryption key 32 outputted from the electronic watermark detection circuit 12 is combined with the first decryption key inputted from the external system by the decryption key combining/generating circuit 34. The decryption key combining/generating circuit 34 generates a decryption key (not shown) necessary for decryption to input into the decryption circuit 14. The decryption circuit 14 decrypts the reproduced data 11 through the use of the decryption key to output the decrypted moving picture/sound data 15.

The structure is arranged as described above, whereby the present embodiment can exhibit almost the same effect as the first embodiment even when the encryption key is different from the decryption key. Further, hereinafter, the description will be made of the advantage peculiar to the present embodiment that it has, and the first embodiment has not.

When the possessor of the moving picture/sound data 1 asks any other than the possessor to fabricate the DVD, it is necessary for the possessor to disclose the first encryption key 21 to the DVD fabricator together with the moving picture/sound data 1. In the first embodiment, since the first encryption key 21 is in common used in the encryption process during DVD fabrication and the decryption process during DVD reproduction, the first encryption key 21 disclosed to the DVD fabricator illegally leaks. When the reproducer of the DVD 9 acquires this first encryption key 21, the DVD 9 reproducer will be able to reproduce by the above-described process without acquiring the first encryption key 21 from the possessor.

On the other hand, in the present embodiment, the first encryption key 21 to be used for the encryption process during DVD fabrication is not the same as the first decryption key 31 to be used for the decryption process during DVD reproduction. Accordingly, the first encryption key 21 is made different from the first decryption key 31, whereby even when the first encryption key 21 disclosed to the DVD fabricator illegally leaks and the DVD 9 reproducer acquires this, the DVD 9 reproducer cannot reproduce through the use of the first encryption key 21 which has illegally leaked.

Therefore, the present embodiment has a special feature that it has more secure prevention against illegal leaking of the encryption key than the first embodiment.

Sixth Embodiment

Figure 13:
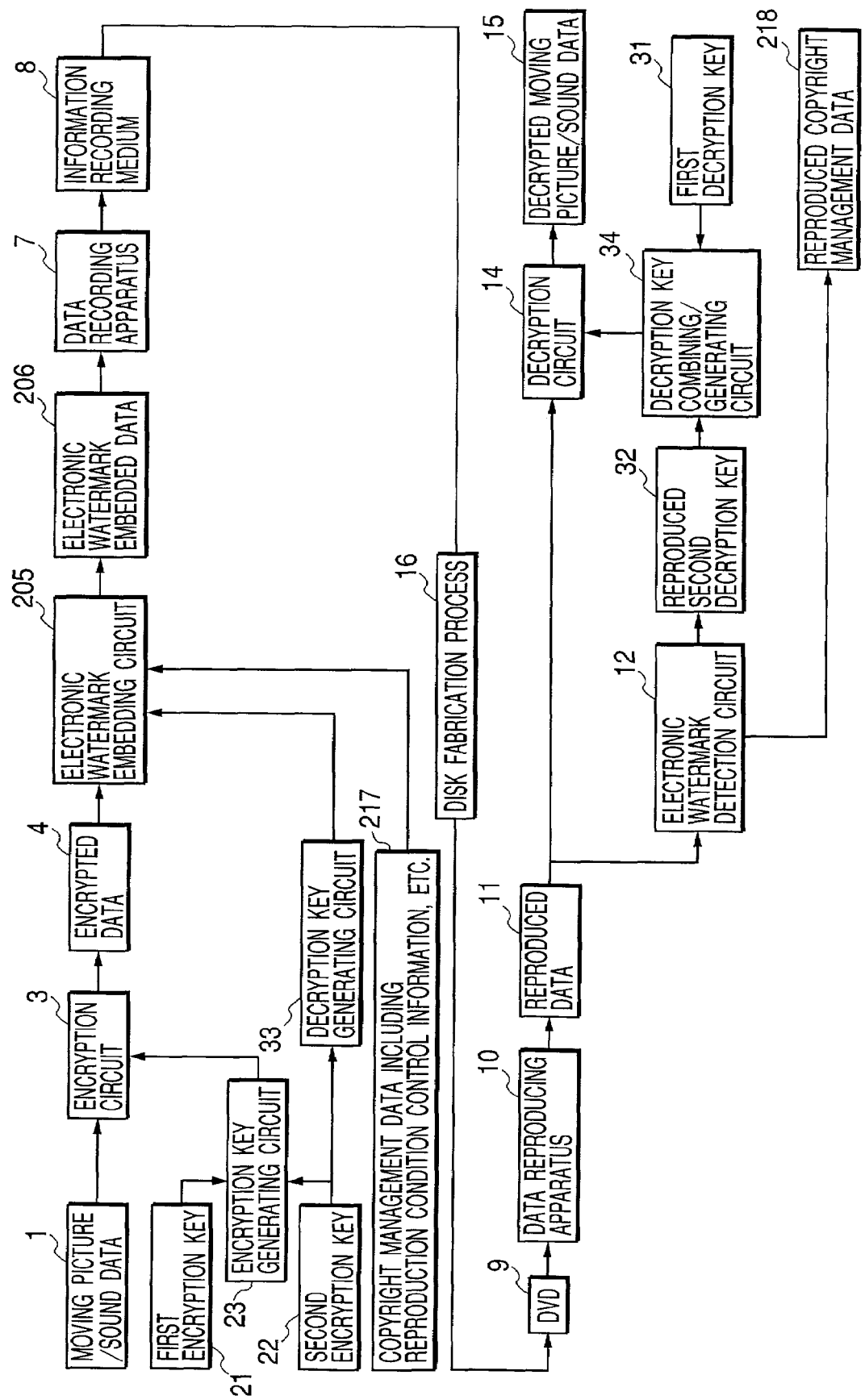
FIG. 13 is a view showing a sixth embodiment.

FIG. 13 shows the sixth embodiment. The present embodiment is a combination of the second embodiment and the fifth embodiment, and the point of difference from the second embodiment is that a case where the key for use with decryption is different from the key for use with encryption has been assumed. Portions identical to those in the above-described embodiment are designated by the identical reference numerals and description thereof will be omitted. Different portions will be described.

First, the data recording side will be described. The decryption key generating circuit 33 generates a second decryption key (not shown) from the second encryption key 22 inputted to output this to the electronic watermark embedding circuit 5 together with the copyright management data 217 including reproduction condition control information, etc. The electronic watermark embedding circuit 5 embeds the second decryption key inputted and the copyright management data 217 including reproduction condition control information, etc. in the encrypted data 4 to output the electronic watermark embedded data 6.

Next, the data reproduction side will be described. From the electronic watermark detection circuit 12, the reproduced copyright management data 218 and the reproduced second decryption key 32 are outputted. The reproduced second decryption key 32 is combined with the first decryption key inputted from the outside by the decryption key combining/generating circuit 34. The decryption key combining/generating circuit 34 generates a decryption key (not shown) necessary for decrypting the cryptogram to input into the decryption circuit 14. The decryption circuit 14 decrypts the cryptogram of the reproduced data 11 through the use of the decryption key to output the decrypted moving picture/sound data 15.

The structure is arranged as described above, whereby the present embodiment can be made to have effects of both the second embodiment and the fifth embodiment.

Seventh Embodiment

Figure 14:
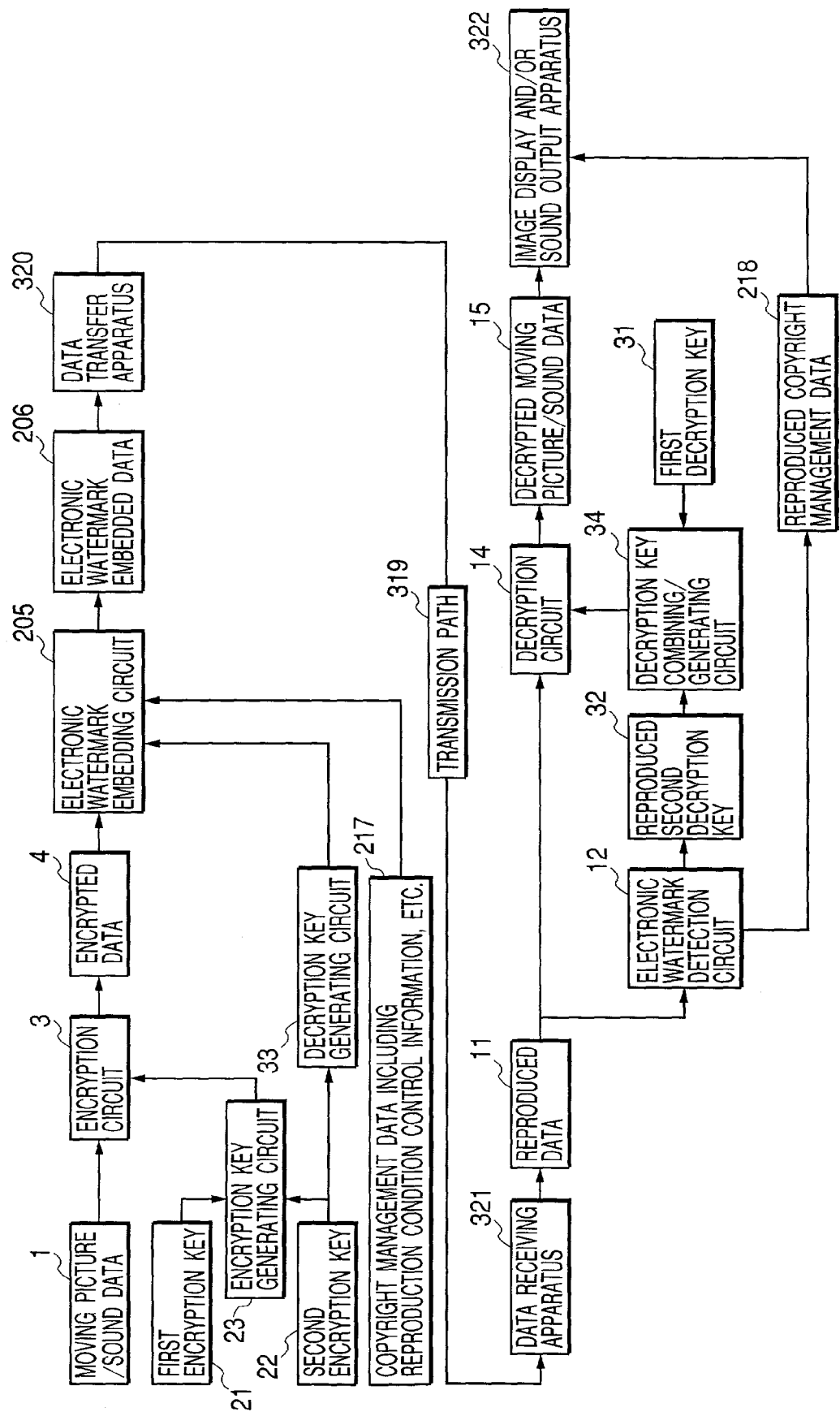
FIG. 14 is a view showing a seventh embodiment.

FIG. 14 shows a seventh embodiment. The present embodiment is a combination of the third embodiment and the fifth embodiment, and the point of difference from the third embodiment is that a case where the key for use with decryption is different from the key with encryption has been assumed. Portions identical to those in the above-described embodiment are designated by the identical reference numerals and description thereof will be omitted. Different portions will be described.

First, the data recording side will be described. The decryption key generating circuit 33 generates a second decryption key (not shown) from the second encryption key 22 inputted to output this to the electronic watermark embedding circuit 5 together with the copyright management data 217 including reproduction condition control information, etc. The electronic watermark embedding circuit 5 embeds the second decryption key inputted and the copyright management data 217 including reproduction condition control information, etc. in the encrypted data 4 to output the electronic watermark embedded data 206.

Next, the data reproduction side will be described. From the electronic watermark detection circuit 12, the reproduced copyright management data 218 and the reproduced second decryption key 32 are outputted. The reproduced second decryption key 32 is combined with the first decryption key 31 inputted from the outside by the decryption key combining/generating circuit 34. The decryption key combining/generating circuit 34 generates a decryption key (not shown) necessary for decrypting the cryptogram to input into the decryption circuit 14. The decryption circuit 14 decrypts the cryptogram of the reproduced data 11 through the use of the decryption key to output the decrypted moving picture/sound data 15.

The structure is arranged as described above, whereby the present embodiment can be made to have effects of both the third embodiment and the fifth embodiment.

Eighth Embodiment

Figure 15:
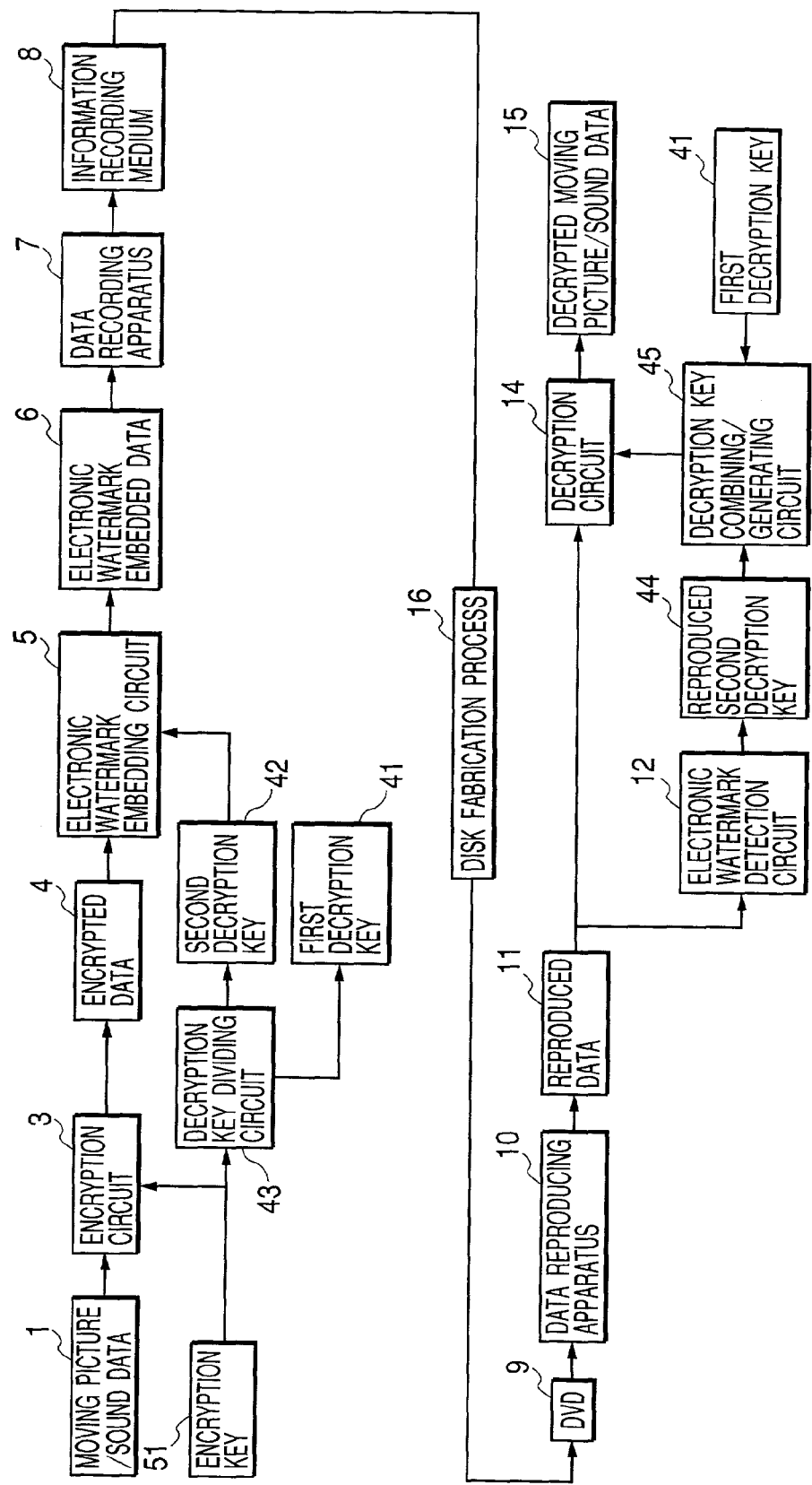
FIG. 15 is a view showing an eighth embodiment.

FIG. 15 shows an eighth embodiment. The present embodiment is similar to the first and fifth embodiments, but is different in that during encryption, one key is used, and that a key necessary for decryption is divided, and one portion of the decryption key divided is embedded in the encrypted data through the use of the electronic watermark. Portions identical to those in the above-described embodiment are designated by the identical reference numerals and description thereof will be omitted. Different portions will be described.

First, the data recording side will be described. An encryption key 51 is inputted in the encryption circuit 3 and the decryption key generating/dividing circuit 43. The encryption circuit 3 generates encrypted data 4 from the moving picture/sound data 1 through the use of the encryption key 51 inputted. The decryption key generating/dividing circuit 43 generates a decryption key from the encryption key 51 inputted, and further divides this decryption key to output the first decryption key 41 and the second decryption key 42. The second decryption key 42 is inputted in the electronic watermark embedding circuit 5. The electronic watermark embedding circuit 5 embeds the second decryption key 42 in the decrypted data 4 through the use of the electronic watermark to output the electronic watermark embedded data 6.

Next, the data reproduction side will be described. From the electronic watermark detection circuit 12, the reproduced second decryption key 44 is outputted. The reproduced second decryption key 44 is combined with the first decryption key 41 inputted from the external system by the decryption key combining/generating circuit 34. The decryption key combining/generating circuit 45 generates a decryption key (not shown) necessary for decrypting the cryptogram to input into the decryption circuit 14. The decryption circuit 14 decrypts the cryptogram of the data 11 through the use of the decryption key to output the decrypted moving picture/sound data 15.

The structure is arranges as described above, whereby the present embodiment can be made to have the substantially same effects as the first embodiment.

In this respect, it is assumed that the first decryption key 41 is used for the same purpose as the first encryption key 21 and the decryption key 31 in the first and fifth embodiments. Specifically, in the first embodiment, a possessor of the moving picture/sound data 1 distributes the first encryption key data to a possessor of the DVD 9 at his request, whereby a right to reproduce the moving picture/sound data 1 is granted to the DVD 9 possessor. Likewise, the first decryption key 41 is distributed, whereby the right to reproduce the moving picture/sound data 1 is granted to the DVD 9 possessor.

Also, as the effect peculiar to the present embodiment that it has, and that the first and fifth embodiments have not, the encryption key necessary together with the moving picture/sound data 1 is only the first encryption key 51, and therefore, it is given that it becomes easier to manage the encryption key.

Ninth Embodiment

Figure 16:
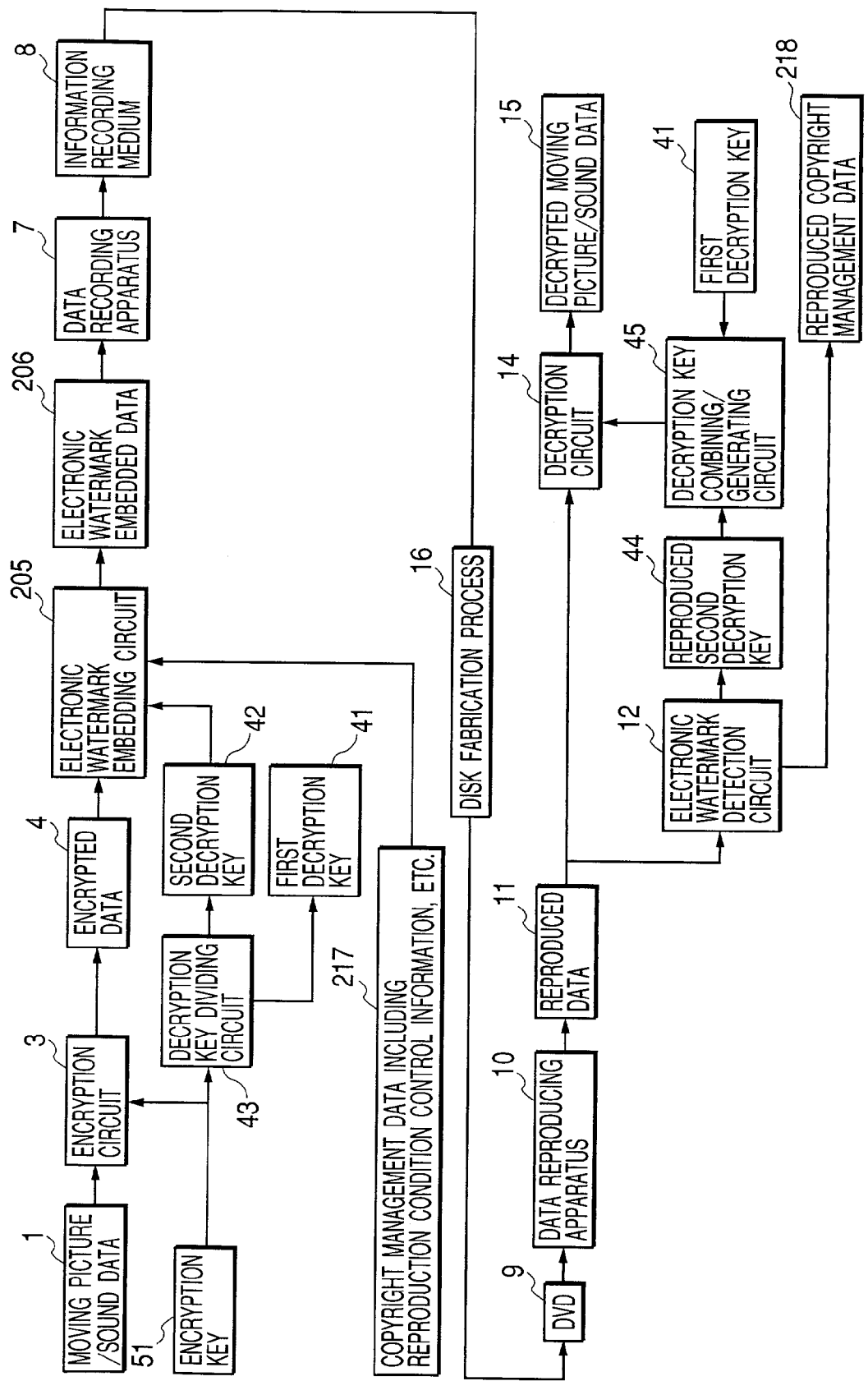
FIG. 16 is a view showing a ninth embodiment.

FIG. 16 shows a ninth embodiment. The present embodiment is similar to the second and sixth embodiments, but is different in that during encryption, one key is used, and that a key necessary for decryption is divided, and one portion of the decryption key divided is embedded in the encrypted data through the use of the electronic watermark. Portions identical to those in the above-described embodiment are designated by the identical reference numerals and description thereof will be omitted. Different portions will be described.

First, the data recording side will be described. An encryption key 51 is inputted in the encryption circuit 3 and the decryption key generating/dividing circuit 43. The encryption circuit 3 generates encrypted data 4 from the moving picture/sound data 1 through the use of the encryption key 51 inputted. The decryption key generating/dividing circuit 43 generates a decryption key from the encryption key 51 inputted, and further divides this decryption key to output the first decryption key 41 and the second decryption key 42. The second decryption key 42 is inputted in the electronic watermark embedding circuit 5. Also, the copyright management data 217 including reproduction condition control information, etc. is also inputted in the electronic watermark embedding circuit 5. The electronic watermark embedding circuit 5 embeds the inputted copyright management data 217 including reproduction condition control information, etc. and the second decryption key 42 in the decrypted data 4 through the use of the electronic watermark to output the electronic watermark embedded data 6.

Next, the data reproduction side will be described. From the electronic watermark detection circuit 12, the reproduced copyright management data 218 and the reproduced second decryption key 44 are outputted. The reproduced second decryption key 44 is combined with the first decryption key 41 inputted from the outside by the decryption key combining/generating circuit 34. The decryption key combining/generating circuit 45 generates a decryption key (not shown) necessary for decrypting the cryptogram to input into the decryption circuit 14. The decryption circuit 14 decrypts the cryptogram of the reproduced data 11 through the use of the decryption key to output the moving picture/sound data 15 decrypted.

The structure is arranges as described above, whereby the present embodiment can be made to have the substantially same effects as the second embodiment.

In this respect, it is assumed that the first decryption key 41 is used for the same purpose as the first encryption key 21 and the decryption key 31 in the second and sixth embodiments. Specifically, in the second embodiment, a possessor of the moving picture/sound data 1 transfers the first encryption key data to a possessor of the DVD 9 at his request, whereby a right to reproduce the moving picture/sound data 1 is granted to the DVD 9 possessor. Likewise, the first decryption key 41 is transferred, whereby the right to reproduce the moving picture/sound data 1 is granted to the DVD 9 possessor.

Also, as the special feature that the present embodiment has, and that the second and sixth embodiments have not, the encryption key necessary together with the moving picture/sound data 1 is one of the first encryption key 51, and therefore, it is given that it becomes easier to manage the encryption key.

Tenth Embodiment

Figure 17:
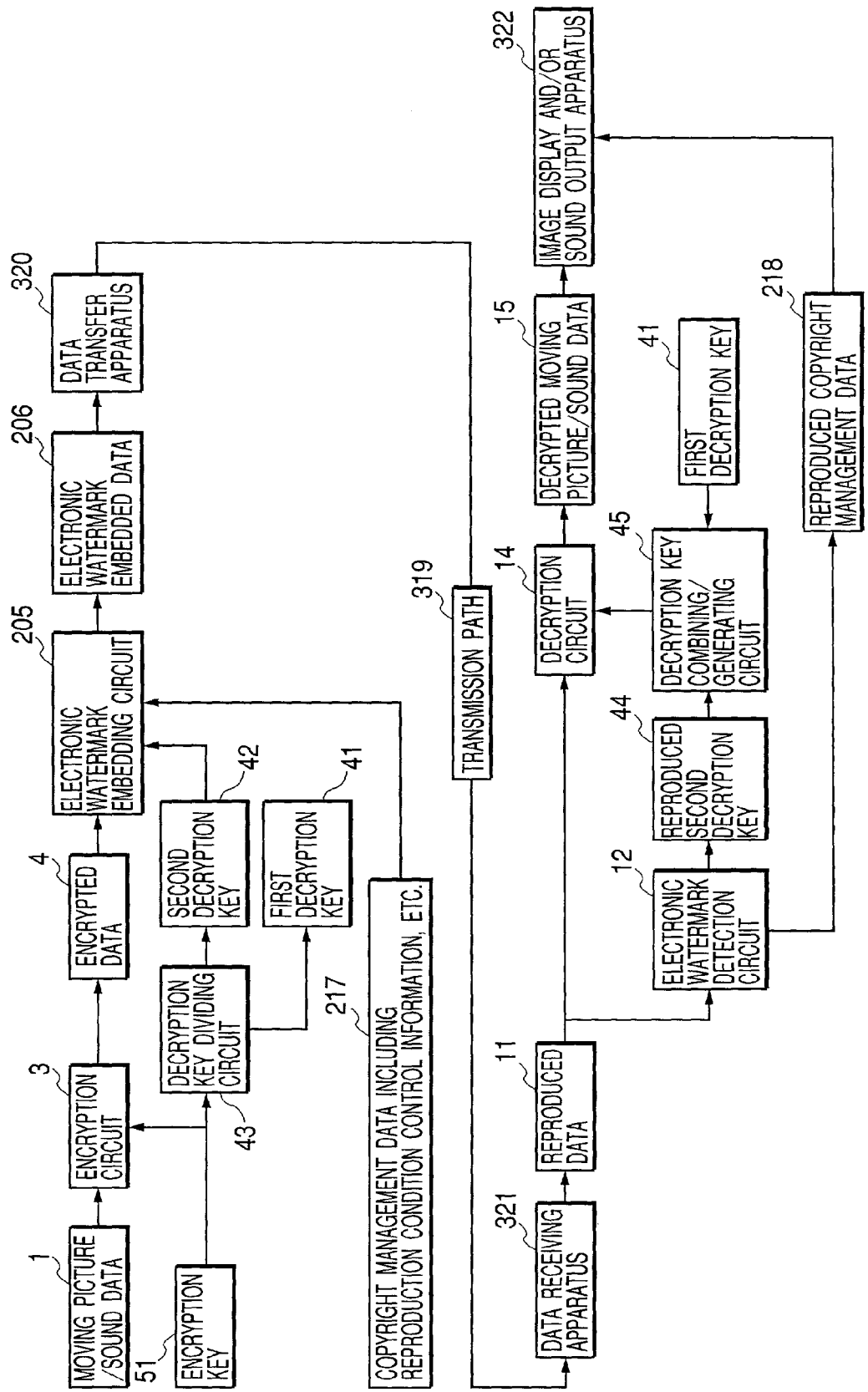
FIG. 17 is a view showing a tenth embodiment.

FIG. 17 shows a tenth embodiment. The present embodiment is similar to the third and seventh embodiments, but is different in that during encryption, one key is used, and that a key necessary for decryption is divided, and one portion of the decryption key divided is embedded in the encrypted data through the use of the electronic watermark. Portions identical to those in the above-described embodiment are designated by the identical reference numerals and description thereof will be omitted. Different portions will be described.

First, the data recording side will be described. An encryption key 51 is inputted in the encryption circuit 3 and the decryption key generating/dividing circuit 43. The encryption circuit 3 generates encrypted data 4 from the moving picture/sound data 1 through the use of the encryption key 51 inputted. The decryption key generating/dividing circuit 43 generates a decryption key from the encryption key 51 inputted, and further divides this decryption key to output the first decryption key 41 and the second decryption key 42. The second decryption key 42 is inputted in the electronic watermark embedding circuit 205. Also, the copyright management data 217 including reproduction condition control information, etc. is also inputted in the electronic watermark embedding circuit 5. The electronic watermark embedding circuit 205 embeds the inputted copyright management data 217 including reproduction condition control information, etc. and the second decryption key 42 in the decrypted data 4 through the use of the electronic watermark to output the electronic watermark embedded data 206.

Next, the data reproduction side will be described. From the electronic watermark detection circuit 12, the reproduced copyright management data 218 and the reproduced second decryption key 44 are outputted. The reproduced second decryption key 44 is combined with the first decryption key 41 inputted from the outside by the decryption key combining/generating circuit 45. The decryption key combining/generating circuit 45 generates a decryption key (not shown) necessary for decrypting the cryptogram to input into the decryption circuit 14. The decryption circuit 14 decrypts the cryptogram of the reproduced data 11 through the use of the decryption key to output the decrypted moving picture/sound data 15.

The structure is arranges as described above, whereby the present embodiment can be made to have the substantially same functions as the third embodiment.

In this respect, it is assumed that the first decryption key 41 is used for the same purpose as the first encryption key 21 and the decryption key 31 in the third and seventh embodiments. Specifically, in the third embodiment, a possessor of the moving picture/sound data 1 transfers the first encryption key data to a possessor of the data receiving apparatus system at his request, whereby a right to reproduce the moving picture/sound data is granted to the data receiving apparatus system possessor. Likewise, the first decryption key 41 is transferred, whereby the right to reproduce the moving picture/sound data 1 is granted to the data receiving apparatus system possessor.

Also, as the special feature that the present embodiment has, and that the third and seventh embodiments have not, the encryption key necessary together with the moving picture/sound data 1 is only the first encryption key 51, and therefore, it is given that it becomes easier to manage the encryption key.

Eleventh Embodiment

Figure 18:
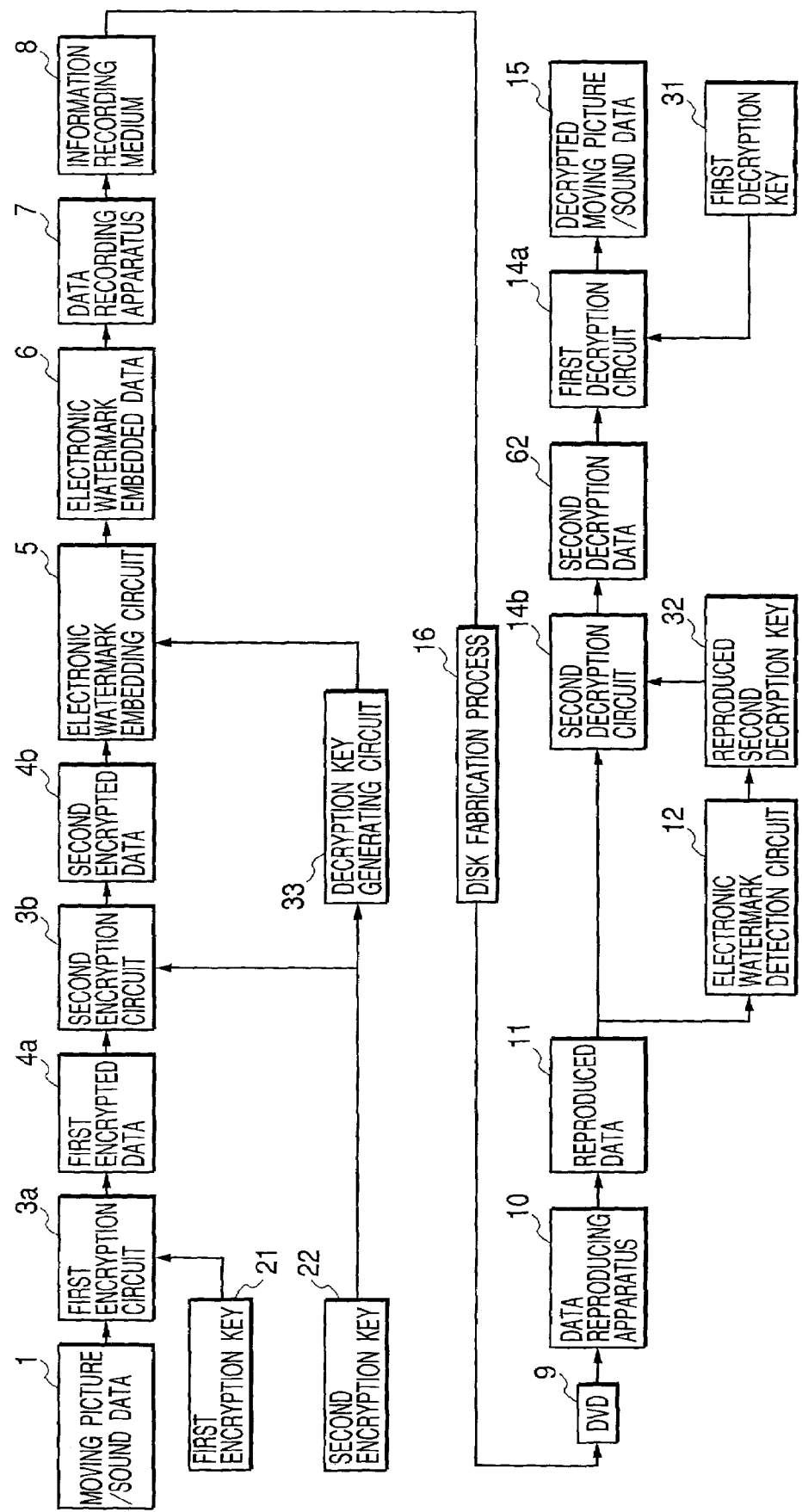
FIG. 18 is a view showing an eleventh embodiment.

FIG. 18 shows an eleventh embodiment. The present embodiment is similar to the fifth embodiment, but is different in that the encryption process is performed twice through the use of a different encryption key. Portions identical to those in the above-described embodiment are designated by the identical reference numerals and description thereof will be omitted. Different portions will be described.

First, the data recording side will be described. The first encryption circuit 3a in which the moving picture/sound data 1 and the first encryption key 21 have been inputted encrypts the moving picture/sound data 1 through the use of the first encryption key 21 to output the first encrypted data 4a. A second encryption circuit 3b in which the first encrypted data 4a and the second encryption key 22 have been inputted encrypts the first encrypted data 4a through the use of the second encryption key 22 to output the second encrypted data 4b. Also, the decryption key generating circuit 33 generates a second decryption key (not shown) from the second encryption key 22 inputted to output this to the electronic watermark embedding circuit 5. The electronic watermark embedding circuit 5 embeds the second decryption key inputted in the second encrypted data 4b to output the electronic watermark embedded data 6.

Next, the data reproduction side will be described. The reproduced second decryption key 32 outputted from the electronic watermark detection circuit 12 is inputted into the decryption circuit 14b. The decryption circuit 14b decrypts the cryptogram of the reproduced data 11 through the use of the reproduced second decryption key 32 to output the second decrypted data 62. The second decrypted data 62 is inputted in the decryption circuit 14b. The decryption circuit 14b decrypts the cryptogram of the second decrypted data 62 through the use of the first decryption key 31 to output the moving picture/sound data 15.

The structure is arranges as described above, whereby the present embodiment has a special feature that it is possible to securely prevent illegal decryption because the present embodiment has one more encryption process than the fifth embodiment.

Twelfth Embodiment

Figure 19:
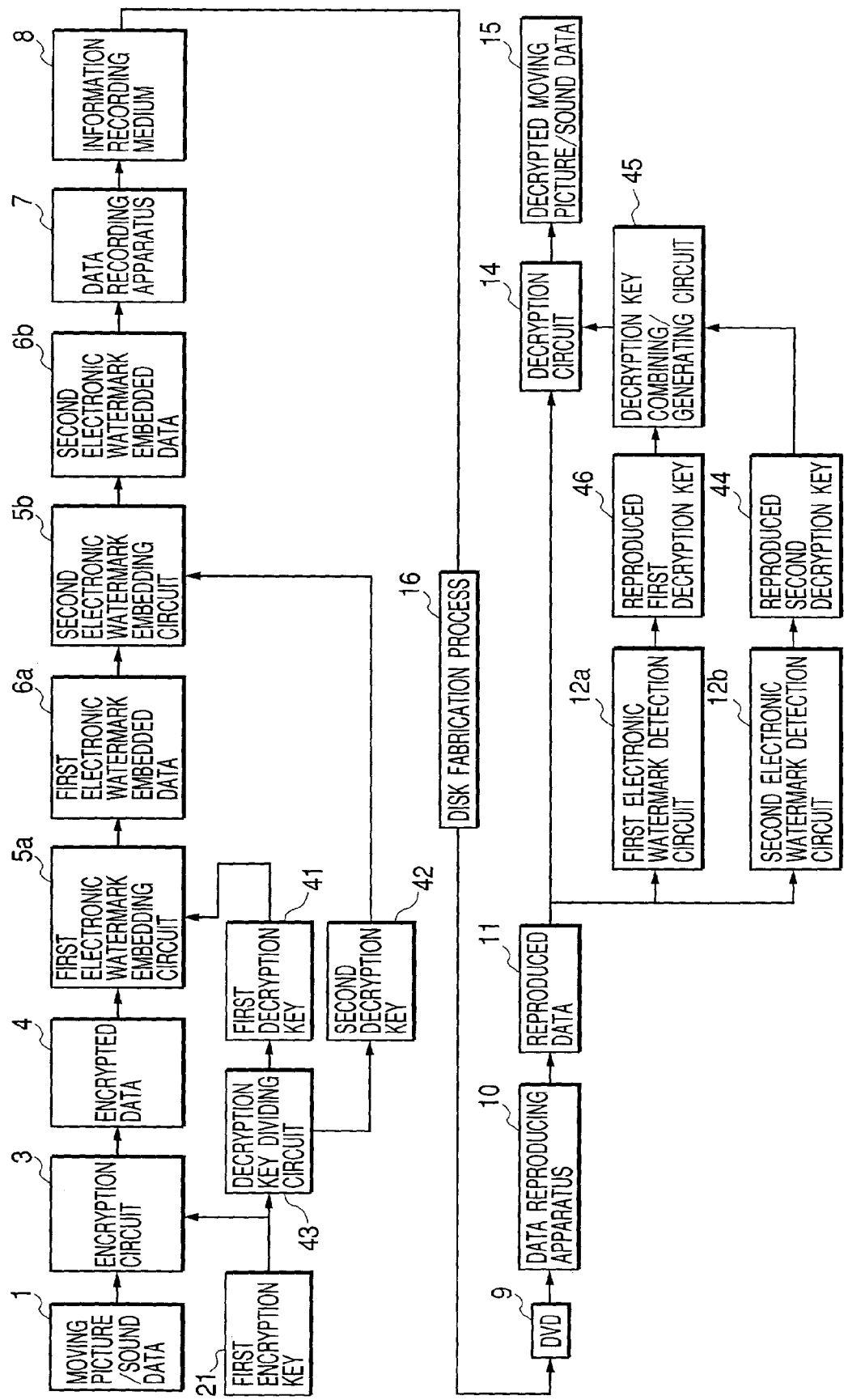
FIG. 19 is a view showing a twelfth embodiment.

FIG. 19 shows a twelfth embodiment. The present embodiment is similar to the eighth embodiment, but is different in that two decryption keys are both embedded in the data through the use of the electronic watermark. Portions identical to those in the above-described embodiment are designated by the identical reference numerals and description thereof will be omitted. Different portions will be described.

First, the data recording side will be described. In a first electronic watermark embedding circuit 5a, there have been inputted the encrypted data 4 and the first decryption key 41. The first electronic watermark embedding circuit 5a embeds the first decryption key 41 in the encrypted data 4 through the use of the electronic watermark to output first electronic watermark embedded data 6a. In a second electronic watermark embedding circuit 5b, there have been inputted the first electronic watermark embedded data 6a and the second decryption key 42. The second electronic watermark embedding circuit 5b embeds the second decryption key 42 in the first electronic watermark embedded data 6a through the use of the electronic watermark to output the second electronic watermark embedded data 6b. The data recording apparatus 7 records the second electronic watermark embedded data 6b in the information recording medium 8.

Next, the data reproduction side will be described. The reproduced data 11 is inputted into the first electronic watermark detection circuit 12a and the second electronic watermark detection circuit 12b. The electronic watermark detection circuit 12a detects the first decryption key from the reproduced data 11 to output the reproduced first decryption key 44a. The electronic watermark detection circuit 12b detects the second decryption key from the reproduced data 11 to output the reproduced second decryption key 44b.

The reproduced first decryption key 44a and the reproduced second decryption key 44b are inputted into the decryption key combining/generating circuit 45, and the decryption key combining/generating circuit 45 outputs a decryption key (not shown) from both. The decryption circuit 14 decrypts the cryptogram of the reproduced data 11 through the use of a decryption key (not shown) outputted from the decryption key combining/generating circuit 45 to output the moving picture/sound data 15.

In this respect, as regards the electronic watermark form to be used in the present embodiment, a form to be used by the first electronic watermark embedding circuit and the first electronic watermark detection circuit, and a form to be used by the second electronic watermark embedding circuit and the second electronic watermark detection circuit may be the same or different from each other.

The structure is arranged as described above, whereby the present embodiment has a special feature as compared with the eighth embodiment that it does not become necessary any longer to transfer the decryption key 1 to the DVD 9 reproducer from the DVD 9 manufacturer. Also, when the decryption key is divided into two and embedded through the use of the electronic watermark, and further, a form to be used by the first electronic watermark embedding circuit and the first electronic watermark detection circuit, and a form to be used by the second electronic watermark embedding circuit and the second electronic watermark detection circuit are made different from each other, whereby the present embodiment has a special feature that it is possible to securely prevent decryption of the encryption key by decryption of the electronic watermark.

What is claimed is:

1. A method of encrypting moving picture or sound data, comprising:
   an encrypted data generating step for encrypting said moving picture or sound data through use of an encryption key to generate first encrypted data;
   a decryption key generating step for generating a decryption key corresponding to said encryption key; and
   a first electronic watermark embedding step for generating second encrypted data by modifying said first encrypted data to embed said decryption key as an electronic watermark into said first encrypted data, said decryption key varying with time and being scattered throughout said second encrypted data in terms of time and space,
   wherein said first electronic watermark embedding step further comprises forming a time-dependent relationship between said first encrypted data and said decryption key within said second encrypted data.

2. The method of encrypting moving picture or sound data according to claim 1, further comprising step of recording said second encrypted data to an information recording medium.

3. A method of encrypting moving picture or sound data, comprising:
   a first encrypted data generating step for encrypting said moving picture or sound data through use of a first encryption key to generate first encrypted data;
   a second encrypted data generating step for encrypting said first encrypted data through use of a second encryption key to generate second encrypted data;
   a decryption key generating step for generating a first decryption key corresponding to said first encryption key and a second decryption key corresponding to said second encryption key; and
   a first electronic watermark embedding step for generating third encrypted data by modifying said second encrypted data to embed either said first decryption key or said second decryption key as an electronic watermark into said second encrypted data, said embedded decryption key varying in time and being scattered throughout said third encrypted data in terms of time and space,
   wherein said first electronic watermark embedding step further comprises forming a time-dependent relationship between said embedded decryption key and said second encrypted data within said third encrypted data.

4. The method of encrypting moving picture or sound data according to claim 3, further comprising step of recording said third encrypted data to an information recording medium.

5. A method of encrypting moving picture or sound data, comprising:
   an encrypted data generating step for encrypting said moving picture or sound data through use of an encryption key to generate first encrypted data;
   a decryption key generating step for generating a decryption key corresponding to said encryption key;
   a first electronic watermark embedding step for generating second encrypted data by modifying said first encrypted data to embed said decryption key as an electronic watermark into said first encrypted data, said decryption key varying with time and being scattered throughout said second encrypted data in terms of time and space,
   wherein said first electronic watermark embedding step further comprises forming a time-dependent relationship between said first encrypted data and said decryption key within said second encrypted data; and
   a step for adding restrictions on decryption based on a password on said second encrypted data.

6. The method of encrypting moving picture or sound data according to claim 5, further comprising step of recording said second encrypted data to an information recording medium.

7. The data encryption method according to claim 1 or 3, further comprising a second electronic watermark embedding step for embedding a decryption key, which has not been embedded in said first electronic watermark embedding step, as a second form of electronic watermark different from said first form of electronic watermark.

8. The data encryption method according to any of claims 1 to 5, wherein in said electronic watermark embedding step, copyright management information which is information on copyright holders or information on restriction on reproduction is embedded as an electronic watermark.

9. An encrypted data decryption method for decrypting encrypted moving picture or sound data, comprising:
a first electronic watermark detection step for detecting a first decryption key from an electronic watermark embedded in said encrypted moving picture or sound data, said encrypted moving picture or sound data having been modified to incorporate said first decryption key as said electronic watermark, wherein said first decryption key varies with time and is scattered throughout said encrypted moving picture or sound data in terms of time and space;
a second detection step for detecting a second decryption key to be inputted from an external system; and
a step for decrypting said encrypted moving picture or sound data through the use of said first and said second decryption keys to obtain decrypted data, wherein said decrypting is performed according to a time-dependent relationship between said first decryption key and said encrypted moving picture or sound data.

10. An encrypted data decryption method for decrypting encrypted moving picture or sound data, comprising:
a first electronic watermark detection step for detecting a first decryption key from an electronic watermark embedded in said encrypted moving picture or sound data, said encrypted moving picture or sound data having been modified to incorporate said first decryption key as said electronic watermark, wherein said first decryption key varies with time and is scattered throughout said encrypted moving picture or sound data in terms of time and space;
a second detection step for detecting a second decryption key to be inputted from an external system;
a step for decrypting said encrypted moving picture or sound data through the use of said first decryption key to obtain first decrypted data, wherein said decrypting is performed according to a time-dependent relationship between said first decryption key and said encrypted moving picture or sound data; and
a step for decrypting said first decrypted data through the use of said second decryption key to obtain second decrypted data.

11. An encrypted data decryption method for decrypting encrypted moving picture or sound data, comprising:
a step for inputting a password which removes restrictions on decryption of said encrypted moving picture or sound data;
a first electronic watermark detection step for detecting a decryption key from an electronic watermark embedded in said encrypted moving picture or sound data, said encrypted moving picture or sound data having been modified to incorporate said decryption key as said electronic watermark, wherein said decryption key varies with time and is scattered throughout said encrypted moving picture or sound data in terms of time and space; and
a step for decrypting said encrypted moving picture or sound data through use of said decryption key to obtain decrypted data, wherein said decrypting is performed according to a time-dependent relationship between said decryption key and said encrypted moving picture or sound data.

12. An encrypted data decryption method for decrypting encrypted data, comprising:
a first detection step for detecting a first decryption key from a first form of electronic watermark embedded in said encrypted moving picture or sound data, said encrypted moving picture or sound data having been modified to incorporate said first decryption key as said first form of electronic watermark;
a second detection step for detecting a second decryption key from a second form of electronic watermark embedded in said encrypted moving picture or sound data, said encrypted moving picture or sound data having been modified to incorporate said second decryption key as said second form of electronic watermark,
wherein said first and second decryption keys vary with time and are scattered throughout said encrypted moving picture or sound data in terms of time and space; and
a step for decrypting said encrypted moving picture or sound data through use of said first and second decryption keys to obtain decrypted data, wherein said decrypting is performed according to a time-dependent relationship between said decryption keys and said encrypted moving picture or sound data.

13. The encrypted data decryption method according to any of claims 9 to 11, wherein in said first electronic watermark detection step, copyright management information which is information on copyright holders or information for restraining the reproduction is detected from the electronic watermark.

14. The encrypted data decryption method according to any of claims 9 to 11, wherein in accordance with user's right information including any of information indicating the authorized/unauthorized looking and listening, information indicating a number of times looking and listening can be made, and information indicating the authorized/unauthorized copying, which is information to be inputted from the external system, the decryption process is restrained.

15. The encrypted data decryption method according to any of claims 9 to 11, wherein said encrypted data is encrypted data reproduced from the information recording medium.

16. The encrypted data decryption method according to any of claims 9 to 11, wherein said encrypted data is encrypted data transferred from a transfer apparatus.

* * * * *